(12) United States Patent
Hasegawa et al.

(10) Patent No.: US 8,949,010 B2
(45) Date of Patent: Feb. 3, 2015

(54) INVERTED PENDULUM TYPE VEHICLE

(71) Applicant: Honda Motor Co., Ltd., Tokyo (JP)

(72) Inventors: Makoto Hasegawa, Wako (JP);
Shinichiro Kobashi, Wako (JP); Shinya Shirokura, Wako (JP); Hideo Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/225,593

(22) Filed: Mar. 26, 2014

(65) Prior Publication Data

US 2014/0297126 A1    Oct. 2, 2014

(30) Foreign Application Priority Data

Mar. 29, 2013  (JP) ................. 2013-074049

(51) Int. Cl.
*G06F 17/10* (2006.01)
*G06G 7/48* (2006.01)

(52) U.S. Cl.
USPC ............ 701/124; 701/36; 701/41; 701/99; 180/21; 180/65.1; 180/205.1; 180/205; 180/208

(58) Field of Classification Search
USPC ............ 701/124, 41, 99, 36; 180/21, 65.1, 180/205.1, 205, 208
See application file for complete search history.

(56) References Cited

U.S. PATENT DOCUMENTS

| | | | | |
|---|---|---|---|---|
| 8,050,837 B2* | 11/2011 | Yamada | ............. | 701/70 |
| 8,353,378 B2* | 1/2013 | Gomi et al. | ............. | 180/218 |
| 8,408,339 B2* | 4/2013 | Makino | ............. | 180/7.1 |
| 8,467,922 B2* | 6/2013 | Takenaka | ............. | 701/22 |
| 8,467,948 B2* | 6/2013 | Takenaka et al. | ............. | 701/70 |
| 8,522,902 B2* | 9/2013 | Gomi et al. | ............. | 180/21 |
| 8,751,110 B2* | 6/2014 | Takenaka et al. | ............. | 701/41 |
| 8,758,191 B2* | 6/2014 | Takenaka et al. | ............. | 476/68 |
| 2005/0126833 A1 | 6/2005 | Takenaka et al. | | |
| 2007/0084662 A1 | 4/2007 | Oikawa | | |
| 2010/0038960 A1 | 2/2010 | Takenaka et al. | | |

(Continued)

FOREIGN PATENT DOCUMENTS

DE    20 2007 007 673 U1    10/2007
EP         1 529 556 A2     5/2005

(Continued)

OTHER PUBLICATIONS

Application of dynamic inversion with extended high-gain observers to inverted pendulum on a cart; Joonho Lee; Mukherjee, R.; Khalil, H.K.; American Control Conference (ACC), 2013; DOI: 10.1109/ACC.2013.6580490; Publication Year: 2013, pp. 4234-4238.*

(Continued)

*Primary Examiner* — Cuong H Nguyen
(74) *Attorney, Agent, or Firm* — Birch, Stewart, Kolasch & Birch, LLP

(57) ABSTRACT

An inverted pendulum type vehicle capable of making mounting and dismounting of an occupant smooth. A control device of an inverted pendulum type vehicle includes a control gain adjustment unit. The control gain adjustment unit changes the magnitude of the control gain used for motion control of an actuator device according to the tilting state of an occupant riding section in a situation where the stepping on of an occupant to the occupant riding section is executed or in a situation where the stepping off of the occupant from the occupant riding section is executed.

20 Claims, 10 Drawing Sheets

(56) References Cited

U.S. PATENT DOCUMENTS

| | | |
|---|---|---|
| 2010/0070132 A1* | 3/2010 | Doi .................... 701/36 |
| 2010/0096905 A1 | 4/2010 | Takenaka et al. |
| 2010/0114421 A1 | 5/2010 | Doi |
| 2010/0299044 A1 | 11/2010 | Miyake et al. |
| 2011/0060518 A1 | 3/2011 | Kosaka |
| 2011/0067936 A1 | 3/2011 | Takenaka et al. |
| 2011/0071714 A1* | 3/2011 | Takenaka ............ 701/22 |
| 2011/0071752 A1 | 3/2011 | Takenaka et al. |
| 2011/0209932 A1 | 9/2011 | Takenaka et al. |
| 2012/0173042 A1 | 7/2012 | Takenaka et al. |
| 2012/0173086 A1 | 7/2012 | Takenaka et al. |

FOREIGN PATENT DOCUMENTS

| | | | |
|---|---|---|---|
| EP | 1 632 428 A1 | | 3/2006 |
| EP | 2 045 180 A1 | | 4/2009 |
| EP | 2 052 924 A1 | | 4/2009 |
| EP | 2 163 467 A1 | | 3/2010 |
| EP | 2 319 750 A1 | | 5/2011 |
| JP | 2004/129435 A | | 4/2004 |
| JP | 4181113 B2 | | 11/2008 |
| JP | 2010-167807 A | | 8/2010 |
| JP | 2010-167808 A | | 8/2010 |
| JP | 2011/063183 A | | 3/2011 |
| JP | 2011-63183 A | | 3/2011 |
| JP | 2011-63241 A | | 3/2011 |
| JP | 2011-63243 A | | 3/2011 |
| JP | 2011-68222 A | | 4/2011 |
| JP | 2011068222 A | * | 4/2011 |
| WO | WO 02/30730 A2 | | 4/2002 |
| WO | WO 2008/132778 A1 | | 11/2008 |
| WO | WO 2008/132779 A1 | | 11/2008 |
| WO | WO 2010/113439 A1 | | 10/2010 |
| WO | WO2011/033575 | * | 3/2011 |

OTHER PUBLICATIONS

Trajectory tracking for wheeled inverted pendulum robot using tilt angle control; Phaoharuhansa, D.; Shimada, A.; Industrial Electronics Society, IECON 2013—39th Annual Conference of the IEEE; DOI: 10.1109/IECON.2013.6699824 Publication Year: 2013, pp. 4288-4293.*

High gain disturbance observer and its application in robust control attenuation; Ziya Jiang; Yuqing He; Jianda Han Information and Automation (ICIA), 2013 IEEE International Conference on; DOI: 10.1109/ICInfA.2013.6720301 Publication Year: 2013, pp. 230-235.*

Fuzzy optimal control for double inverted pendulum; Al-Hadithi, B.M.; Barragan, A.J.; Andujar, J.M.; Jimenez, A. Industrial Electronics and Applications (ICIEA), 2012 7th IEEE Conference on; DOI: 10.1109/ICIEA.2012.6360687 Publication Year: 2012, pp. 1-5.*

Fault tolerant improvement with chaos synchronization using Fuzzy-PID control; Ghorbani, F.; Aliyari Shooredeli, M.; Teshnehlab, M.; Fuzzy Systems (IFSC), 2013 13th Iranian Conference on; DOI: 10.1109/IFSC.2013.6675645; Publication Year: 2013, pp. 1-5.*

Variable gain linear quadratic regulator and its application; Yongli Zhang; Lifang Song; Guoliang Zhao; Liying Liu; Qingmei Yao Mechatronics and Automation (ICMA), 2014 IEEE International Conference on; DOI: 10.1109/ICMA.2014.6885964; Publication Year: 2014, pp. 1745-1750.*

Neural Network-Based Motion Control of an Underactuated Wheeled Inverted Pendulum Model; Yang, C.; Li, Z.; Cui, R.; Xu, B. Neural Networks and Learning Systems, IEEE Transactions on; vol. 25, Issue: 11; DOI: 10.1109/TNNLS.2014.2302475 Publication Year: 2014, pp. 2004-2016.*

Analysis and Design of Robust Feedback Control Systems for a Nonlinear Two-Wheel Inverted Pendulum System Mao-Lin Chen; Computer, Consumer and Control (IS3C), 2012 International Symposium on; DOI: 10.1109/IS3C.2012.248 Publication Year: 2012, pp. 949-953.*

* cited by examiner

INVERTED PENDULUM TYPE VEHICLE

CROSS-REFERENCE TO RELATED APPLICATIONS

The present application claims priority under 35 USC 119 to Japanese Patent Application No. 2013-074049 filed Mar. 29, 2013 the entire contents of which are hereby incorporated by reference.

BACKGROUND OF THE INVENTION

1. Field of the Invention

The present invention relates to an inverted pendulum type vehicle configured to be capable of moving on a floor surface.

2. Description of Background Art

An inverted pendulum type vehicle including footsteps in the vehicle front part is known. See, for example, JP-A No. 2010-167808.

In this inverted pendulum type vehicle, the mounting and dismounting by an occupant is executed in a state where the footsteps are grounded onto the floor surface, and a vehicle body and a riding seat are tilted forward.

In the inverted pendulum type vehicle according to JP-A No. 2010-167808, the mounting and dismounting of the occupant is executed in a state where the vehicle body and the riding seat are tilted forward. Therefore, there is a risk that the vehicle starts to move forward because the vehicle is tilted forward in the middle of mounting and dismounting of the occupant at the time of the start of riding or the time of the termination of riding of the vehicle. Accordingly, there is a problem that movement of the vehicle is not smooth and is liable to impart the occupant an uncomfortable feeling at the time of mounting and dismounting of the occupant.

SUMMARY AND OBJECTS OF THE INVENTION

The present invention has been developed in view of such circumstance, and its object of an embodiment of the present invention to provide an inverted pendulum type vehicle capable of making the mounting and dismounting of an occupant smooth.

According to an embodiment of the present invention, the inverted pendulum type vehicle includes a moving motion unit configured to be capable of moving on a floor surface, with an actuator device that drives the moving motion unit, a base that incorporates the moving motion unit and the actuator device, an occupant riding section incorporated into the base so as to be tiltable with respect to the vertical direction, a tilting state detection unit that detects the tilting state of the occupant riding section and a control device configured to control motion of the actuator device at least according to the tilting state of the occupant riding section detected by the tilting state detection unit, in which the control device is configured to include control gain adjusting means that changes the magnitude of a control gain used for controlling motion of the actuator device according to the tilting state of the occupant riding section in a period in which the state of the inverted pendulum type vehicle shifts from a stop support state that is a state supported by a support mechanism and stopping to a support release reference riding state that is a state an occupant rides on the occupant riding section in a reference attitude state and support of the inverted pendulum type vehicle by the support mechanism is released at the time the occupant steps onto the occupant riding section, or in a period shifting from the support release reference riding state to the stop support state at the time the occupant steps off from the occupant riding section according to the detected tilting state of the occupant riding section.

In the present invention, the "reference attitude state" is a state in which the center of gravity of the entirety combining the occupant riding on the occupant riding section and the inverted pendulum type vehicle (may be hereinafter simply referred to as a "vehicle") is positioned generally just above the action center of the grounding load applied to the moving motion unit (so-called floor reaction force center).

According to an embodiment of the present invention, the magnitude of the control gain used for controlling the motion of the actuator device according to the tilting state of the occupant riding section changes according to the detected tilting state of the occupant riding section in a period in which the state of the vehicle shifts from the stop support state to the support release reference riding state at the time of the stepping on of the occupant to the occupant riding section, or in a period in which the state of the vehicle shifts from the support release reference riding state to the stop support state at the time of the stepping off of the occupant from the occupant riding section.

The control gain decides the sensitivity of change in the motion of the actuator with respect to change in the tilting state of the occupant riding section (for example, the manipulated variable and the like deciding the drive force or the movement acceleration of the moving motion unit).

According to an embodiment of the present invention, the actuator device can be controlled so that such movement of the moving motion unit as imparting an uncomfortable feeling to the occupant does not occur in the period described above. Also, the stepping on and the stepping off of the occupant can be made smooth.

According to an embodiment of the present invention, it is preferable that, when the inclination angle of the occupant riding section in the stop support state is defined as a first inclination angle and the inclination angle of the occupant riding section in the support release reference riding state is defined as a second inclination angle, the control gain adjusting means is configured to change the magnitude of the control gain with a characteristic that the magnitude of the control gain increases accompanying that the inclination angle of the occupant riding section shown by the detected tilting state of the occupant riding section approaches from the first inclination angle to the second inclination angle in a period shifting from the stop support state to the support release reference riding state or in a period shifting from the support release reference riding state to the stop support state.

According to an embodiment of the present invention, in a state where the state of the vehicle is the stop support state or the state near it, the magnitude of the control gain is small, and therefore the moving motion unit is prevented from moving sensitively. Also, the stepping on and the stepping off of the occupant in the stop support state can be made comfortable.

Also, in a state where the state of the vehicle is the support release reference riding state or the state near it, the magnitude of the control gain is large, and therefore the attitude of the occupant riding section and the attitude of the occupant are easily maintained at the reference attitude state.

According to an embodiment of the present invention, it is preferable that the control gain adjusting means is configured to change the magnitude of the control gain with a characteristic that the change amount of the magnitude of the control gain per unit change amount of the inclination angle of the occupant riding section shown by the detected tilting state of the occupant riding section becomes larger than the change amount of the magnitude of the control gain in an angle range closer to the first inclination angle and in an angle range closer to the second inclination angle than an intermediate angle range between the first inclination angle and the second inclination angle in the intermediate angle range in a period shifting from the stop support state to the support release reference riding state or in a period shifting from the support release reference riding state to the stop support state.

According to an embodiment of the present invention, in the stop support state or a state near it and in the support release reference riding state or a state near it, change in the control gain with respect to change in the inclination angle of the occupant riding section is suppressed. Also, the control gain can be changed smoothly with respect to a change in the inclination angle of the occupant riding section.

According to an embodiment of the present invention, it is preferable that, when the control gain includes a first control gain used for controlling movement of the moving motion unit in the right/left direction of the inverted pendulum type vehicle by the actuator device and a second control gain used for controlling movement of the moving motion unit in the front/rear direction of the inverted pendulum type vehicle by the actuator device, the control gain adjusting means is configured to change the magnitude of the first control gain and the second control gain so that an angle range of the inclination angle of the occupant riding section that exhibits such a characteristic that the magnitude of the first control gain increases accompanying that the inclination angle of the occupant riding section shown by the detected tilting state of the occupant riding section approaches from the first inclination angle to the second inclination angle in a period shifting from the stop support state to the support release reference riding state or in a period shifting from the support release reference riding state to the stop support state becomes an angle range closer to the first inclination angle than an angle range of the inclination angle of the occupant riding section that exhibits such a characteristic that the magnitude of the second control gain increases accompanying that the inclination angle of the occupant riding section shown by the detected tilting state of the occupant riding section approaches from the first inclination angle to the second inclination angle.

According to an embodiment of the present invention, the magnitude of the first control gain becomes comparatively large when the state of the vehicle becomes the state on the support release reference riding state side than the stop support state or the state near it. For example, at the time of the stepping on of the occupant to the occupant riding section, when the state of the vehicle shifts from the stop support state or the state near it to the state closer to the support release reference riding state, the first control gain increases quicker compared to the second control gain.

The first control gain is the control gain used for controlling movement of the moving motion unit in the right/left direction of the vehicle by the actuator device.

According to an embodiment of the present invention, tilting of the occupant riding section around the axis in the front/rear direction (tilting in the right/left direction) is suppressed in the period other than the period in which the state of the vehicle becomes the stop support state or the state near it at the time of the stepping on of the occupant to the occupant riding section or at the time of the stepping off of the occupant from the occupant riding section. Also, the stepping on and off of the occupant can be made smoother.

According to an embodiment of the present invention, the control gain adjusting means may be configured to forcibly increase the magnitude of the control gain when the inclination angle of the occupant riding section shown by the detected tilting state of the occupant riding section becomes the angle on the rearward inclined side of the occupant in a period shifting from the support release reference riding state to the stop support state at the time of the stepping off of the occupant from the occupant riding section.

According to an embodiment of the present invention, the occupant riding section is prevented from tilting to the rearward inclined side of the occupant at the time of the stepping off of the occupant from the occupant riding section. Therefore, the stepping off of the occupant from the occupant riding section can be made smoother.

According to an embodiment of the present invention, the control gain adjusting means may be configured to forcibly increase the magnitude of the control gain when the moving speed of the moving motion unit increases at a temporal change rate of a predetermined value or more in a period shifting from the support release reference riding state to the stop support state at the time of the stepping off of the occupant from the occupant riding section.

According to an embodiment of the present invention, the attitude of the occupant riding section can be prevented from being disturbed when the moving speed of the moving motion unit quickly increases due to jumping off of the occupant from the occupant riding section in the middle of the period shifting from the support release reference riding state to the stop support state at the time of the stepping off of the occupant from the occupant riding section.

According to an embodiment of the present invention, it is preferable that notifying means is further included which notifies of the detected tilting state of the occupant riding section in a period shifting from the stop support state to the support release reference riding state or in a period shifting from the support release reference riding state to the stop support state.

According to an embodiment of the present invention, the tilting state of the occupant riding section is notified at the time of the stepping on of the occupant to the occupant riding section or at the time of the stepping off of the occupant from the occupant riding section. Therefore, the occupant can step on to the occupant riding section or step off from the occupant riding section while recognizing the tilting state of the occupant riding section. Also, the stepping on or the stepping off described above can be executed smoother.

According to an embodiment of the present invention, the notifying means is configured to notify of the tilting state of the occupant riding section by at least either one of a LED display and a speaker for example.

According to an embodiment of the present invention, the occupant can recognize the tilting state of the occupant riding section by visual or auditory notification.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
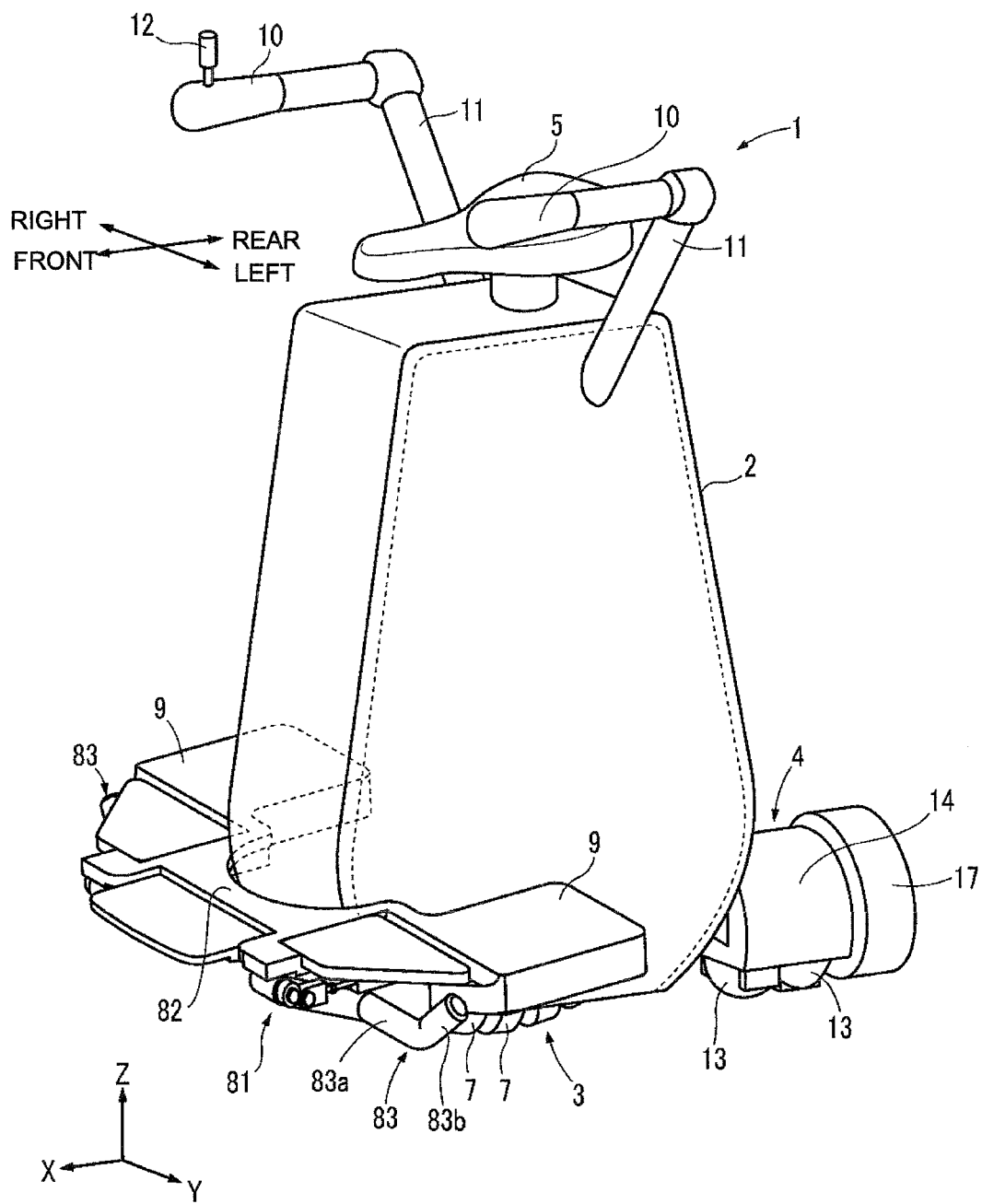
FIG. 1 is a perspective view of the outer appearance of the inverted pendulum type vehicle of the first embodiment of the present invention.
Figure 2:
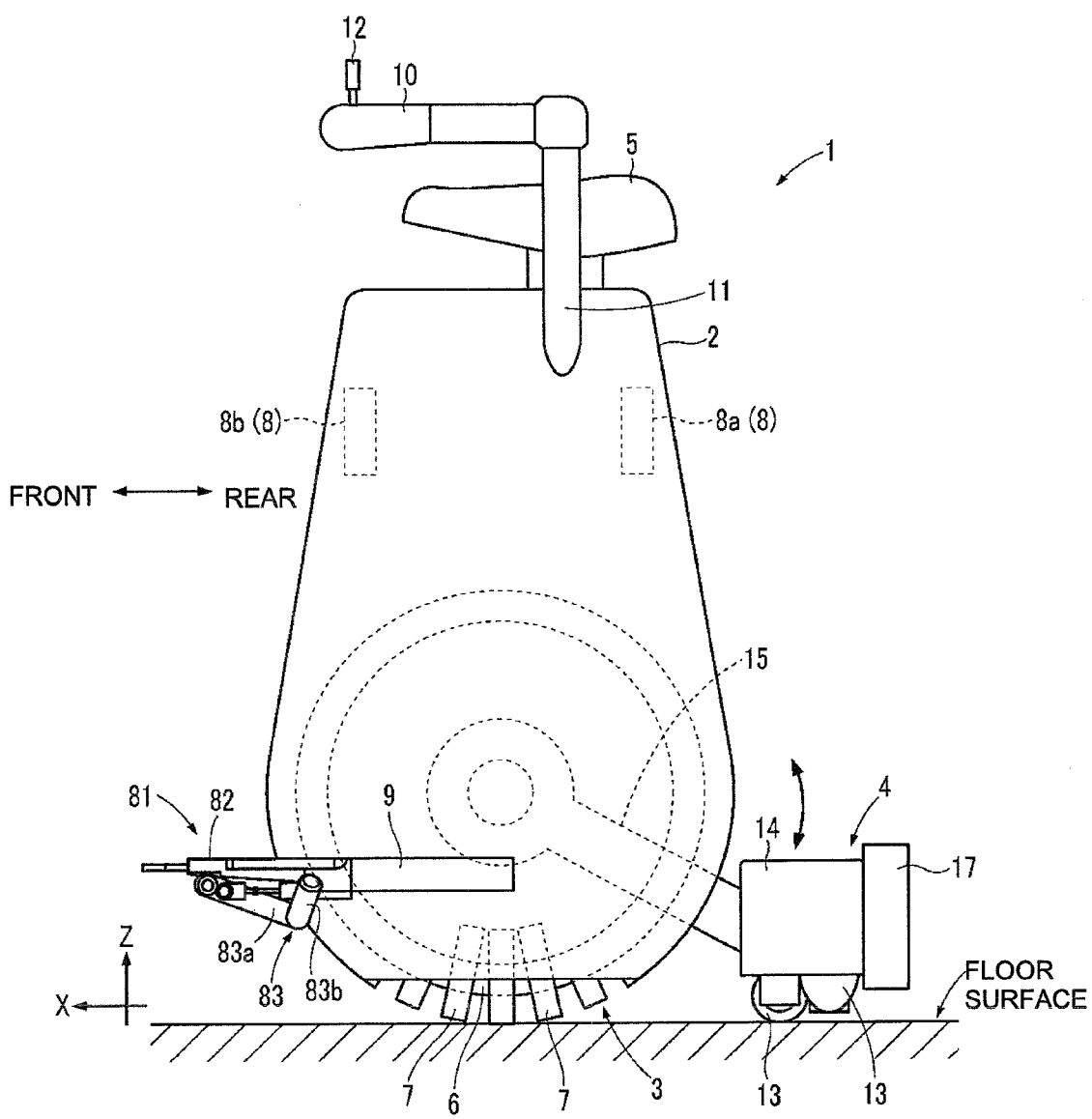
FIG. 2 is a side view of the inverted pendulum type vehicle of the first embodiment.

The first embodiment of the present invention will be described referring to FIG. 1 to FIG. 12. As shown in FIG. 1 and FIG. 2, an inverted pendulum type vehicle 1 (may be hereinafter simply referred to as a vehicle 1) of the present embodiment includes a base 2, a first moving motion unit 3 and a second moving motion unit 4 capable of moving on a floor surface, and an occupant riding section 5 on which an occupant rides.

The first moving motion unit 3 corresponds to a moving motion unit in the present invention. The first moving motion unit 3 includes a core body 6 of an annular shape shown in FIG. 2 (hereinafter referred to as an annular core body 6), and a plurality of rollers 7 of an annular shape mounted on the annular core body 6 so as to be arrayed at equal angular intervals in the circumferential direction (the direction around the axis) of the annular core body 6. The respective rollers 7 are externally inserted to the annular core body 6 with their rotation axes being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and a plurality of rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves in the direction orthogonal to the axis of the annular core body 6 and the direction inclined with respect to the axial direction of the annular core body 6.

Thus, the first moving motion unit 3 can move to all direction on the floor surface. In the description below, as shown in FIG. 1 and FIG. 2, out of the moving directions of the first moving motion unit 3, the direction orthogonal to the axis of the annular core body 6 is made the X-axis direction, the axial direction of the annular core body 6 is made the Y-axis direction, and the vertical direction is made the Z-axis direction. Also, the forward direction is made the positive direction of the X-axis, the leftward direction is made the positive direction of Y-axis, and the upward direction is made the positive direction of Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, a first actuator device 8 that generates a drive force for moving the first moving motion unit 3 is mounted. The first actuator device 8 is formed of an electric motor 8a as an actuator rotationally driving the annular core body 6 and an electric motor 8b as an actuator rotationally driving the respective rollers 7. Further, it is configured that the electric motors 8a, 8b impart rotational drive force to the annular core body 6 and the respective rollers 7 through power transmission mechanisms whose illustrations are omitted. Also, the power transmission mechanisms may have a known structure.

The first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction integrally with the base 2.

A pair of footrests 9, 9 on which the occupant sitting on the occupant riding section 5 places the occupant's feet and a pair of holders 10, 10 held by the occupant are further incorporated into the base 2.

Figure 3:
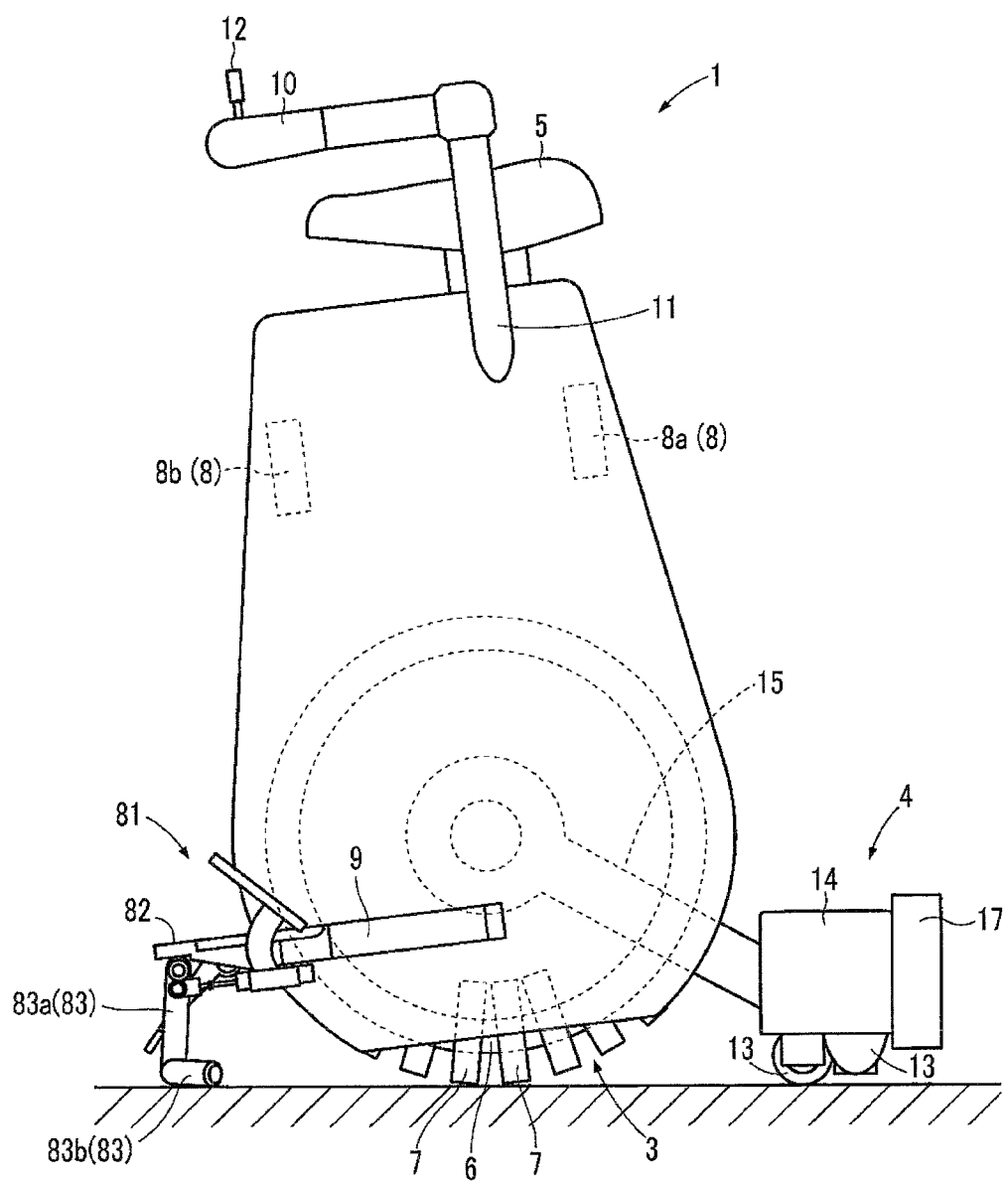
FIG. 3 is a side view of the inverted pendulum type vehicle in a state supported by a stand mechanism included in the inverted pendulum type vehicle of the first embodiment.

The footrests 9, 9 are arranged projectingly in the lower part of both sides of the base 2. Also, in FIG. 2 and FIG. 3, illustration of the footrest 9 on one side (right side) is omitted.

Further, the holders 10, 10 are ones having a bar shape disposed so as to extend in the X-axis direction (front/rear direction) on both sides of the occupant riding section 5 and are respectively fixed to the base 2 through rods 11 extended from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

In the present embodiment, the second moving motion unit 4 is formed of a so-called omni-wheel. The omni-wheel as the second moving motion unit 4 has a known structure including a pair of coaxial annular core bodies (illustration thereof is omitted) and a plurality of barrel-like rollers 13 externally inserted so as to be rotatable with the rotation axis being directed to the circumferential direction of the annular core bodies in the respective annular core bodies.

In this case, the second moving motion unit 4 is disposed on the rear side of the first moving motion unit 3 with the axis of the pair of annular core bodies being directed to the X-axis direction (front/rear direction), and is grounded to the floor surface through the rollers 13.

The roller 13 on one side and the roller 13 on the other side of the pair of annular core bodies are disposed so as to shift the phase in the circumferential direction of the annular core bodies and it is configured that either one of the roller 13 on one side and the roller 13 on the other side of the pair of annular core bodies is grounded to the floor surface when the pair of annular core bodies rotate.

The second moving motion unit 4 formed of the omni-wheel is connected to the base 2. More specifically, the second moving motion unit 4 includes a case 14 that covers a portion on the upper side of the omni-wheel (the entirety of the pair of annular core bodies and the plurality of rollers 13), and the pair of annular core bodies of the omni-wheel are journaled to the case 14 so as to be rotatable around the axis of the pair of annular core bodies. Also, an arm 15 extending from the case 14 to the base 2 side is journaled to the base 2 so as to be swingable around the axis of the annular core bodies 6 of the first moving motion unit 3. Thus, the second moving motion unit 4 is connected to the base 2 through the arm 15.

Also, the second moving motion unit 4 is made swingable with respect to the base 2 around the axis of the annular core bodies 6 of the first moving motion unit 3 by the swinging of the arm 15, and thereby, the occupant riding section 5 is made capable of tillable around Y-axis along with the base 2 while both of the first moving motion unit 3 and the second moving motion unit 4 are grounded.

It may be also configured that the arm 15 is journaled to the axis section of the annular core bodies 6 of the first moving motion unit 3 and the second moving motion unit 4 is connected to the first moving motion unit 3 through the arm 15.

Further, it may be also configured that the base 2 and the occupant riding section 5 are prevented from being inclined excessively to the rear side of the occupant by restricting the swing range of the second moving motion unit 4 around the axis of the annular core body 6 of the first moving motion unit 3 by a stopper and the like.

Also, the second moving motion unit 4 may be energized by a spring so as to be pressed to the floor surface.

As described above, similarly to the first moving motion unit 3, the second moving motion unit 4 can move on the floor surface in all direction including the X-axis direction and the Y-axis direction by executing either one or both of rotation of the pair of annular core bodies of the second moving motion unit 4 and rotation of the rollers 13. More specifically, the second moving motion unit 4 is made movable in the Y-axis direction (right/left direction) by rotation of the annular core bodies, and is made movable in the X-axis direction (front/rear direction) by rotation of the rollers 13.

Also, to the case 14 of the second moving motion unit 4, an electric motor 17 as the second actuator device that drives the second moving motion unit 4 is attached. So as to rotationally drive a pair of annular core bodies of the second moving motion unit 4, the electric motor 17 is connected to the pair of annular core bodies.

Therefore, in the present embodiment, it is configured that the second moving motion unit 4 is moved in the X-axis direction in a subordinate manner following the movement of the first moving motion unit 3 in the X-axis direction, and the second moving motion unit 4 is moved in the Y-axis direction by rotatingly driving the pair of annular core bodies of the second moving motion unit 4 by the electric motor 17.

In addition, the second moving motion unit 4 may have a structure similar to that of the first moving motion unit 3.

The vehicle 1 of the present embodiment further includes a stand mechanism 81 as a support mechanism supporting the vehicle 1 in stopping while riding of the vehicle 1 is stopped. This stand mechanism 81 will be described referring to FIG. 1 to FIG. 3.

The stand mechanism 81 shown in FIG. 3 shows an action state of the time the stand mechanism 81 supports the vehicle 1 on the floor surface (hereinafter referred to as the ON state of the stand mechanism 81), and the stand mechanism 81 of FIG. 1 and FIG. 2 shows a state in which the support of the vehicle 1 by the stand mechanism 81 is released and the stand mechanism 81 is stored (hereinafter referred to as OFF state of the stand mechanism 81).

As shown in FIG. 1 to FIG. 3, the stand mechanism 81 is incorporated into the front part of the footrests 9, 9. More specifically, the stand mechanism 81 includes a pair of left and right stand sections 83, 83 journaled so as to be swingable around the axis in the right/left direction (the Y-axis direction) in both left and right sides of a bridge 82 that connects the front ends of the footrests 9 to each other. Each stand section 83 includes a standing section 83a that is a bar-like member bendingly formed and stands in the vertical direction in ON state of the stand mechanism 81, and a grounding section 83b extending in the lateral direction from the lower end of the standing section 83a and contacting the floor surface.

In the ON state of the stand mechanism 81, as shown in FIG. 3, it is configured that the vehicle 1 is supported on the ground surface by grounding the grounding sections 83b, 83b of both the stand sections 83, 83 on the ground surface while the first moving motion unit 3 is grounded. In this state, the occupant riding section 5 and the base 2 become a forward inclined state.

Also, in the OFF state of the stand mechanism 81, as shown in FIG. 1, the standing section 83a of each stand section 83 becomes an attitude state almost parallel to the footrest surface (upper surface) of the footrest 9.

Further, the stand mechanism 81 is configured so that the action state (ON state or OFF state) is switched by a predetermined operation thereof.

The above is the mechanical configuration of the vehicle 1 in the present embodiment.

Figure 4:
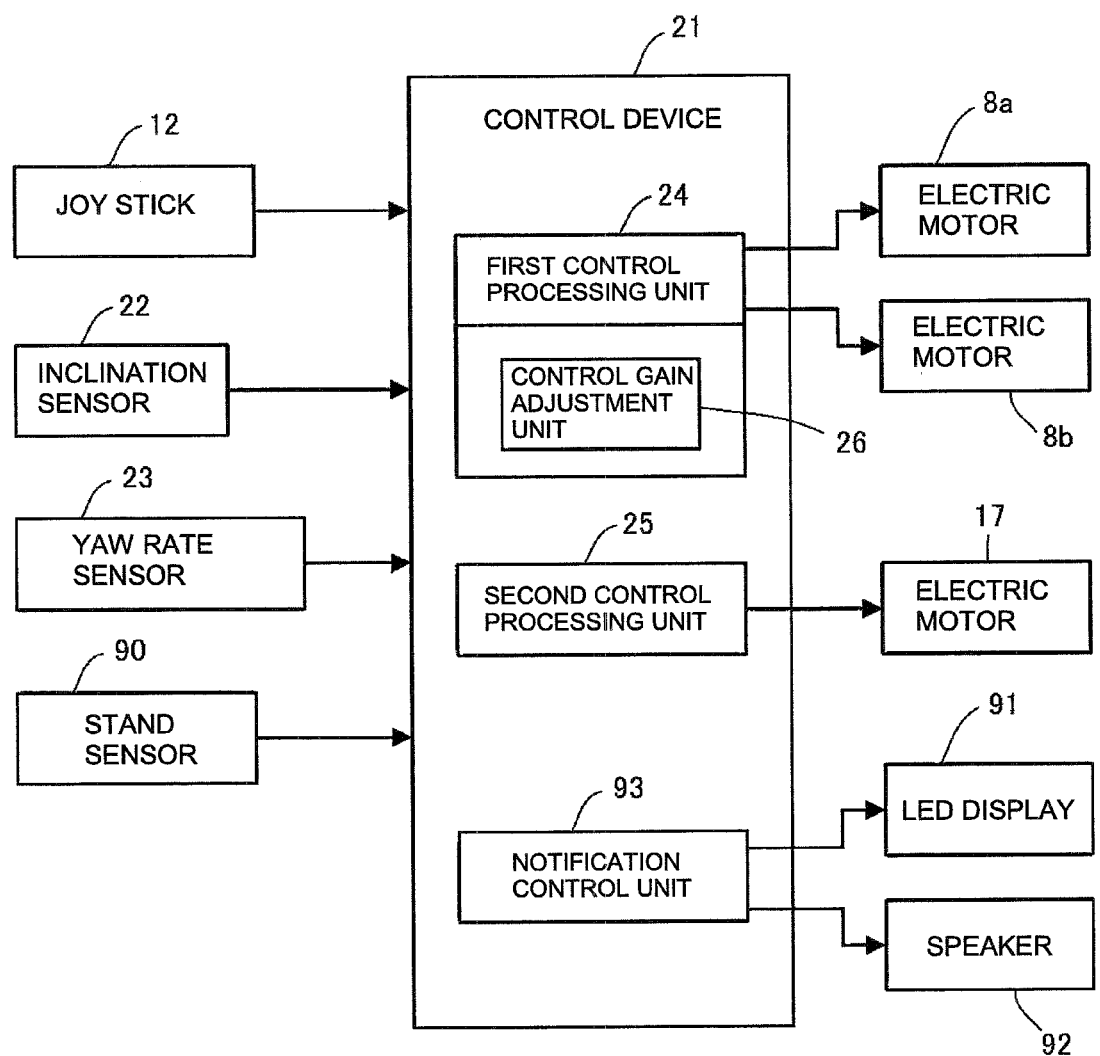
FIG. 4 is a block diagram showing a configuration for controlling the inverted pendulum type vehicle of the first embodiment.

Although illustrations in FIG. 1 to FIG. 3 are omitted, on the base 2 of the vehicle 1 in the present embodiment, as a configuration for motion control of the vehicle 1 (motion control of the first moving motion unit 3 and the second moving motion unit 4), as shown in FIG. 4, a control device 21 formed of an electronic circuit unit including CPU, RAM, ROM and the like, an inclination sensor 22 for measuring the inclination angle of the occupant riding section 5 (the inclination angle of the base 2) with respect to the vertical direction, and a yaw rate sensor 23 for measuring the angular velocity around the yaw axis of the vehicle 1 are mounted.

Also, the vehicle 1 includes a stand sensor 90 that outputs a signal according to whether the action state of the stand mechanism 81 is the ON state or the OFF state, an LED display 91 as a visual notifying tool in order to execute various notifications to the occupant and a speaker 92 as an auditory notifying tool. These LED display 91 and speaker 92 are installed in the holder 10 and the like. Also, either one of the LED display 91 or the speaker 92 may be omitted. Further, the LED display 91 or the speaker 92 may be included in a terminal device carried by the occupant.

It is configured that the output of the joy stick 12, the detection signal of the inclination sensor 22 and the yaw rate sensor 23, and the detection signal of the stand sensor 90 are inputted to the control device 21.

Also, the control device 21 may be formed of plural electronic circuit units that can communicate with each other.

The inclination sensor 22 corresponds to a tilting state detection unit in the present invention, and is formed of an acceleration sensor and an angular velocity sensor such as a gyro-sensor. Also, the control device 21 acquires the measured value of the inclination angle of the occupant riding section 5 (in other words, the inclination angle of the base 2) from the detection signal of these acceleration sensor and angular velocity censor using a known method. As the method, for example, a method proposed by the applicant of the present application in Japanese Patent No. 4181113 can be employed.

Also, more specifically, the inclination angle of the occupant riding section 5 (or the inclination angle of the base 2) in the present embodiment is the inclination angle that makes the attitude of the occupant riding section 5 (or the base 2), in a state where the center of gravity of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Also, the control device 21 includes a first control processing unit 24 controlling moving motion of the first moving motion unit 3 by controlling the electric motors 8a, 8b that form the first actuator device 8, a second control processing unit 25 controlling moving motion of the second moving motion unit 4 by controlling the electric motor 17 as the second actuator device, and a notification control unit 93 controlling the motion of the LED display 91 and the speaker 92 in addition to the function for acquiring the measured values as described above as a function achieved by an installed program and the like (function achieved by software) or a function formed by hardware.

Further, the notification control unit 93 corresponds to notification means in the present invention along with the LED display 91 and the speaker 92.

By executing the calculation process described below, the first control processing unit 24 calculates the first target speed that is a target value of the moving speed of the first moving motion unit 3 (more specifically, a set of the translational speed in the X-axis direction and the translational speed in the Y-axis direction) one by one, and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

Further, the first control processing unit 24 also has a function as a control gain adjustment unit 26 (refer to FIG. 4) for changing the control gain described below at the time of the stepping on of the occupant to the occupant riding section 5 and at the time of the stepping off of the occupant from the occupant riding section 5. The control gain adjustment unit 26 corresponds to control gain adjusting means in the present invention.

By executing the calculation processing described below, the second control processing unit 25 calculates the second target speed that is a target value of the moving speed of the second moving motion unit 4 (more specifically, the translational speed in the Y-axis direction) one by one, and controls the rotational speed of the electric motor 17 so that the actual moving speed of the second moving motion unit 4 in the Y-axis direction agrees to the second target speed.

In this case, similarly to the case of the first moving motion unit 3, the relation between the rotational speed of the electric motor 17 and the actual moving speed of the second moving motion unit 4 in the Y-axis direction is determined beforehand, and it is configured so that the target value of the rotational speed of the electric motor 17 is decided according to the second target speed of the second moving motion unit 4. Also, by feedback-control of the rotational speed of the electric motor 17 to the target value decided according to the second target speed, the actual moving speed of the second moving motion unit 4 in the Y-axis direction is controlled to the second target speed.

In addition, in the present embodiment, the second moving motion unit 4 is moved in the X-axis direction in a subordinate manner following the movement of the first moving motion unit 3 in the X-axis direction. Therefore, it is not necessary to set the target value of the moving speed of the second moving motion unit 4 in the X-axis direction.

Next, processing of the first control processing unit 24 and the second control processing unit 25 will be described in more detail. First, processing of the first control processing unit 24 will be described referring to FIG. 5 to FIG. 8. Also, processing of the control gain adjustment unit 26 of the first control processing unit 24 will be described later.

Figure 5:
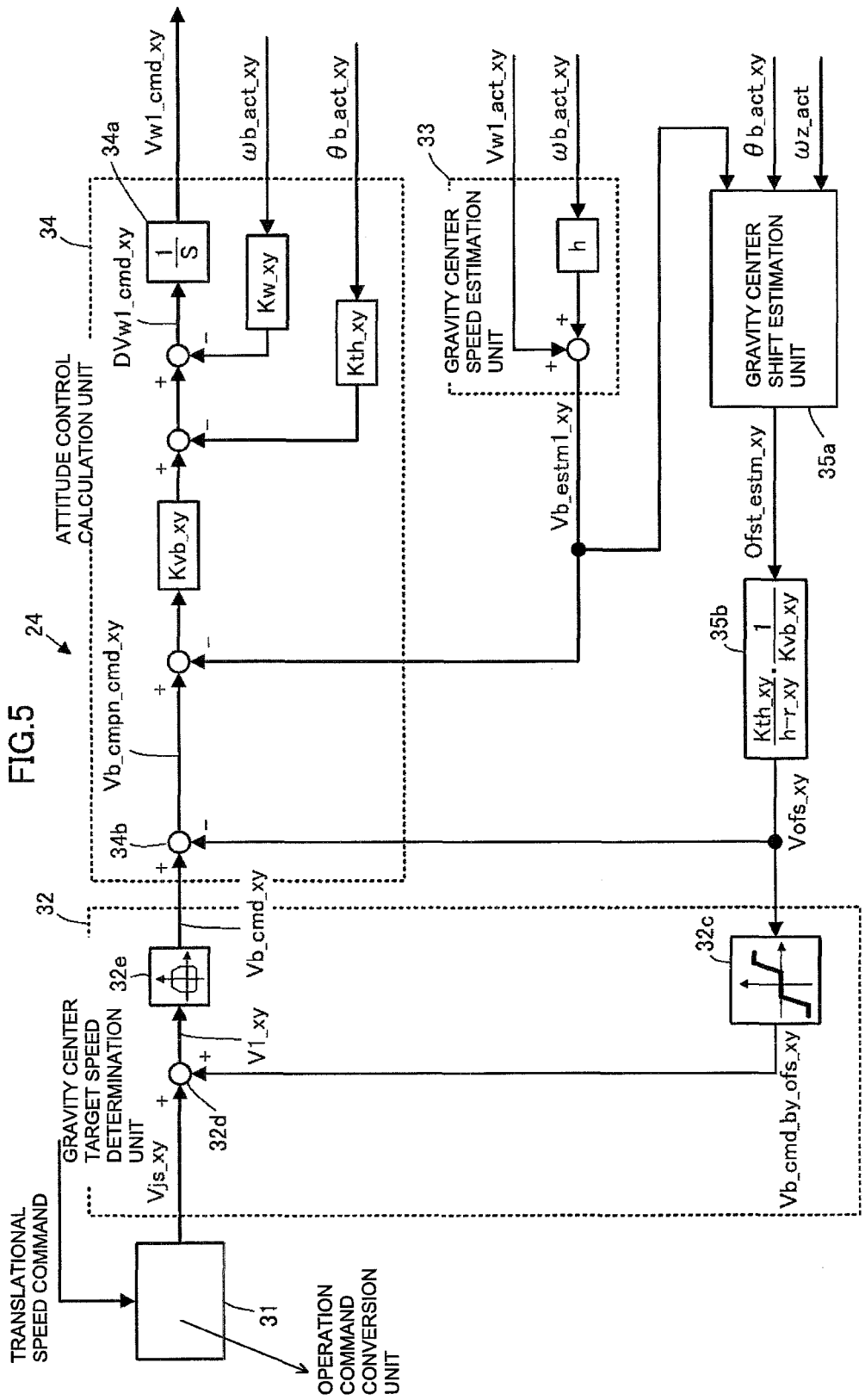
FIG. 5 is a block diagram showing processing of the first control processing unit shown in FIG. 4.

As shown in FIG. 5, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a center of gravity target speed determination unit 32 that determines the target speed of the center of gravity of the entirety including the vehicle 1 and the occupant riding on the occupant riding section 5 thereof (hereinafter referred to as the vehicle system entirety center of gravity), a center of gravity speed estimation unit 33 that estimates the speed of the vehicle system entirety center of gravity and an attitude control calculation unit 34 that determines the target value of the moving speed of the first moving motion unit 3 so as to control the attitude of the occupant riding section 5 (the attitude of the base 2) while making the speed of the vehicle system entirety center of gravity estimated follow the target speed. Also, the first control processing unit 24 executes processing of these respective function units at a predetermined calculation processing period of the control device 21.

Further, in the present embodiment, the vehicle system entirety center of gravity has a meaning as an example of the representative point of the vehicle 1. Therefore, the speed of the vehicle system entirety center of gravity means the moving speed of the representative point of the vehicle 1.

Figure 6:
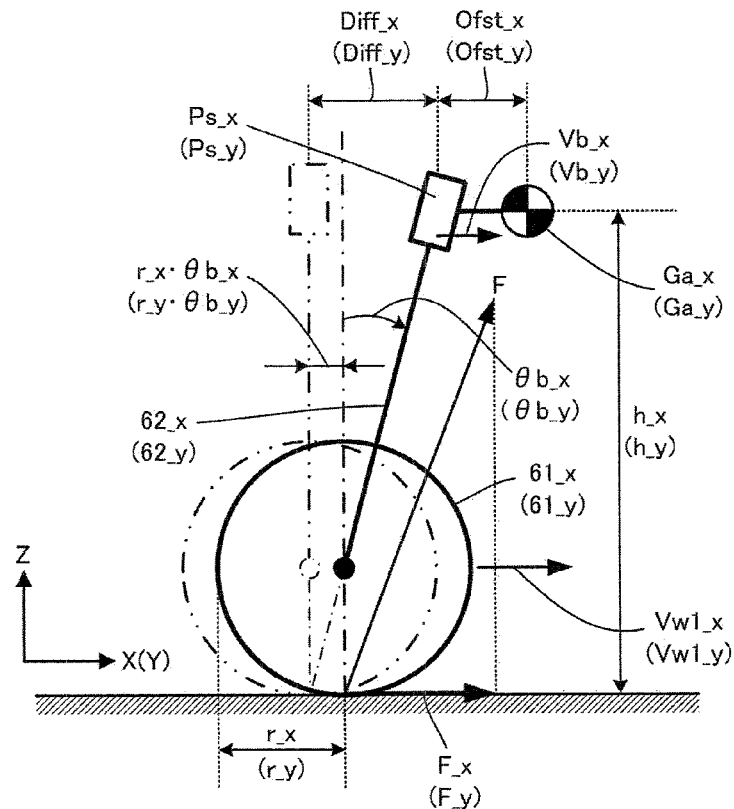
FIG. 6 is a drawing for explaining an inverted pendulum model used for processing of the first control processing unit shown in FIG. 4.

Before processing of the respective function units of the first control processing unit 24 is described specifically, facts that become the base of the processing will be described. The dynamic behavior of the vehicle system entirety center of gravity (more specifically, the behavior as viewed in the Y-axis direction and the behavior as viewed in the X-axis direction) is approximately expressed by the behavior of an inverted pendulum model as shown in FIG. 6. The algorithm of the processing of the first control processing unit 24 is constructed on the basis of this behavior.

Also, including the reference signs in FIG. 6, in the description below, the suffix "_x" means the reference sign of the variables and the like as viewed from the Y-axis direction, and the suffix "_y" means the reference sign of the variables and the like as viewed from the X-axis direction. Further, in FIG. 6, in order to illustrate both of the inverted pendulum model as viewed from the Y-axis direction and the inverted pendulum model as viewed from the X-axis direction, the reference signs of the variables as viewed from the Y-axis direction is not in parentheses, and the reference signs of the variables as viewed from the X-axis direction is in parentheses.

The inverted pendulum model expressing the behavior of the vehicle system entirety center of gravity as viewed from the Y-axis direction includes an imaginary wheel 61_x having the rotation axis parallel to the Y-axis direction and rollable on the floor surface (hereinafter referred to as the imaginary wheel 61_x), a rod 62_x extended from the rotation center of the imaginary wheel 61_x and swingable around the rotation axis of the imaginary wheel 61_x (in the direction around Y-axis), and a mass point Ga_x connected to a reference Ps_x that is the distal end (upper end) of the rod 62_x.

In the inverted pendulum model, the motion of the mass point Ga_x is equivalent to the motion of the vehicle system entirety center of gravity as viewed from the Y-axis direction, and the inclination angle θb_x (the inclination angle in the direction around Y-axis) of the rod 62_x with respect to the vertical direction agrees to the inclination angle in the direction around Y-axis of the occupant riding section 5 (or the base 2). Also, the translational motion in the X-axis direction of the first moving motion unit 3 is equivalent to the translational motion in the X-axis direction caused by rolling of the imaginary wheel 61_x.

Further, the radius r_x of the imaginary wheel 61_x and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around −Y-axis from the floor surface. In the present embodiment, this rx is equivalent to the distance between the axis of the annular core bodies 6 of the first moving motion unit 3 and the grounding surface.

In a similar manner, the inverted pendulum model expressing the behavior of the vehicle system entirety center of gravity as viewed from the X-axis direction includes an imaginary wheel 61_y having the rotation axis parallel to the X-axis direction and rollable on the floor surface (hereinafter referred to as the imaginary wheel 61_y), a rod 62y extended from the rotation center of the imaginary wheel 61_y and swingable around the rotation axis of the imaginary wheel 61_y (in the direction around X-axis), and a mass point Ga_y connected to a reference Ps_y that is the distal end (upper end) of the rod 62_y.

In the inverted pendulum model, the motion of the mass point Ga_y is equivalent to the motion of the vehicle system entirety center of gravity as viewed from the X-axis direction, and the inclination angle θb_y (the inclination angle in the direction around X-axis) of the rod 62_y with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_y.

Further, the radius r_y of the imaginary wheel 61_y and the height h_y of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height by of the reference Psy and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

A comment will be added on the positional relation between the reference Ps_x and the mass point Ga_x as viewed from the Y-axis direction. The position of the reference Ps_x is equivalent to the position of the vehicle system entirety center of gravity in a case where the occupant riding (sitting on) the occupant riding section 5 is assumed to be immobile with respect to the occupant riding section 5.

Therefore, in this case, the position of the mass point Ga_x agrees to the position of the reference Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system entirety center of gravity come to be shifted to the lateral direction respectively from the positions of the reference Ps_x, Ps_y in general. Therefore, in FIG. 6, the positions of the mass points Ga_x, Ga_y are illustrated in a state shifted respectively from the positions of the reference Ps_x, Psy.

The behavior of the vehicle system entirety center of gravity expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \quad (1a)$$

$$dVb\_x/dt = (g/h) \cdot (\theta b\_x \cdot (h - r\_x) + Ofst\_x) + \omega z \cdot Vb\_y \quad (1b)$$

$$Vb\_y = Vw1\_y + h\_y \cdot \omega b\_y \quad (2a)$$

$$dVb\_y/dt = (g/h) \cdot (\theta b\_y(h - r\_y) + Ofst\_y) - \omega z \cdot Vb\_x \quad (2b)$$

Here, Vb_x is the speed (translational speed) in the X-axis direction of the vehicle system entirety center of gravity, Vw1_x is the moving speed (translational speed) in the X-axis direction of the imaginary wheel 61*x*, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system entirety center of gravity (the position in the X-axis direction of the mass point Ga_x) from the position of the reference Ps_x, Vb_y is the speed (translational speed) in the Y-axis direction of the vehicle system entirety center of gravity, Vw1_y is the moving speed (translational speed) in the Y-axis direction of the imaginary wheel 61__*y*, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system entirety center of gravity (the position in the Y-axis direction of the mass point Ga_y) from the position of the reference Ps_y. Also, ωz is the yaw rate (the angular velocity in the direction around the yaw axis) when the vehicle 1 turns, and g is the gravitational acceleration constant. Further, the positive direction of θb_x, ωb_x is the direction that the vehicle system entirety center of gravity inclines to the positive direction of the X-axis (forward), and the positive direction of θb_y, ωb_y is the direction that the vehicle system entirety center of gravity inclines to the positive direction of Y-axis (leftward). Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·ωb_y) is the translational speed component in the Y-axis direction of the reference Ps_y generated by tilting of the occupant riding section 5 in the direction around –X-axis.

In addition, more specifically, Vw1_x in the expression (1a) is the relative circumferential speed of the imaginary wheel 61__*x* with respect to the rod 62__*x* (in other words, with respect to the occupant riding section 5 or the base 2). Therefore, in Vw1_x, in addition to the moving speed in the X-axis direction of the grounding point of the imaginary wheel 61__*x* to the floor surface (the moving speed in the X-axis direction of the grounding point of the first moving motion unit 3 to the floor surface), a velocity component accompanying tilting of the rod 62__*x* (=r_x·ωb_x) is included. This fact is similar to Vw1_y in the expression (2a) also.

Also, the first term of the right side of the expression (1b) is the acceleration component in the X-axis direction generated in the vehicle system entirety center of gravity by the component in the X-axis direction (F_x in FIG. 6) of the floor reaction force (F in FIG. 6) applied to the grounding part of the imaginary wheel 61__*x* according to the shift amount (=θb_x·(h−r_x)+Ofst_x) of the position in the X-axis direction of the vehicle system entirety center of gravity (the position in the X-axis direction of the mass point Ga_x) from the upper position in the vertical direction of the grounding part of the imaginary wheel 61__*x* (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system entirety center of gravity by the component in the Y-axis direction (F_y in FIG. 6) of the floor reaction force (F in FIG. 6) applied to the grounding part of the imaginary wheel 61__*y* according to the shift amount (=θb_y·(h−r_y)+Ofst_y) of the position in the Y-axis direction of the vehicle system entirety center of gravity (the position in the Y-axis direction of the mass point Ga_y) from the upper position in the vertical direction of the grounding part of the imaginary wheel 61__*y* (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

Figure 7:
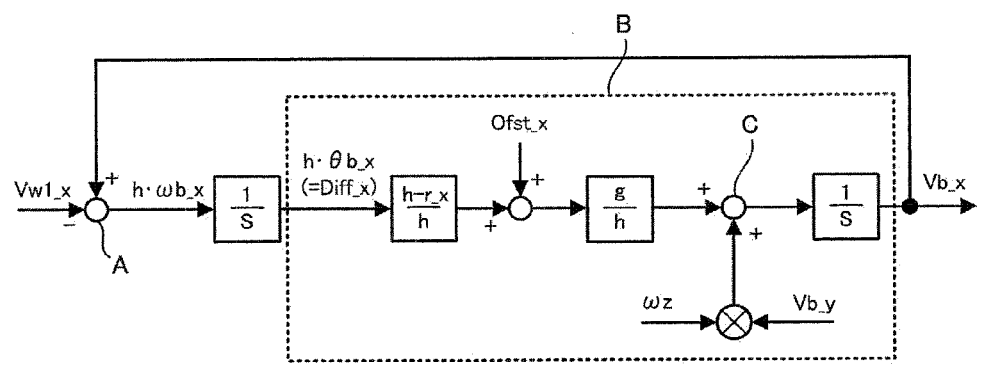
FIG. 7 is a block diagram showing a behavior in relation with the inverted pendulum model of FIG. 6.

As described above, the behavior expressed by the expressions (1a), (1b) (the behavior as viewed in the X-axis direction) is expressed as shown in FIG. 7 when expressed by a block diagram. 1/s in the drawing expresses integral calculation.

Also, processing of the calculation unit marked with the reference sign A in FIG. 7 corresponds to the relation formula of the expression (1a), and processing of the calculation unit marked with the reference sign B corresponds to the relation formula of the expression (1b).

Further, h·θb_x in FIG. 7 approximately agrees to Diff_x shown in FIG. 6.

On the other hand, the block diagram that expresses the behavior expressed by the expressions (2a), (2b) (the behavior as viewed in the Y-axis direction) is obtained by substituting "_y" for the suffixes "_x" in FIG. 7 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system entirety center of gravity (inverted pendulum model) that takes the shift amount of the vehicle system entirety center of gravity from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

Reference is made to FIG. 5. At each calculation processing period of the control device 21, the first control processing unit 24 executes processing of the operation command conversion unit 31 and processing of the center of gravity speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The center of gravity speed estimation unit 33 calculates an estimate value Vb_estm1_xy of the speed of the vehicle system entirety center of gravity based on a geometric (kinematic) relation formula expressed by the expressions (1a), (2a) in the inverted pendulum model.

More specifically, as shown in the block diagram of FIG. 4, the estimate value Vb_estm1_xy of the speed of the vehicle system entirety center of gravity is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system entirety center of gravity.

The estimate value Vb_estm1_x of the speed in the X-axis direction and the estimate value Vb_estm1_y of the speed in the Y-axis direction of the vehicle system entirety center of gravity are calculated respectively by expressions (3a), (3b) below.

$$Vb\_estm1\_x = Vw1\_act\_x + h \cdot \omega b\_act\_x \qquad (3a)$$

$$Vb\_estm1\_y = Vw1\_act\_y + h \cdot \omega b\_act\_y \qquad (3b)$$

However, the temporal change rate of the shift amount Ofst_xy of the position of the vehicle system entirety center of gravity from the position of the reference Ps_xy (hereinafter referred to as a center of gravity shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1_act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, newest values of the temporal change rate of the measured value of the inclination angle θb of the occupant riding section 5 based on the detection signal of the inclination sensor 22 (in other words, newest values of the measured values of ωb_act_x, ωb_act_y) are used.

The first control processing unit 24 determines a center of gravity shift amount estimate value Ofst_estm_xy that is the estimate value of the center of gravity shift amount Ofst_xy by executing processing of the operation command conversion unit 31 and the center of gravity speed estimation unit 33 as described above and thereafter executing processing of a center of gravity shift estimation unit 35a shown in FIG. 5.

Figure 8:
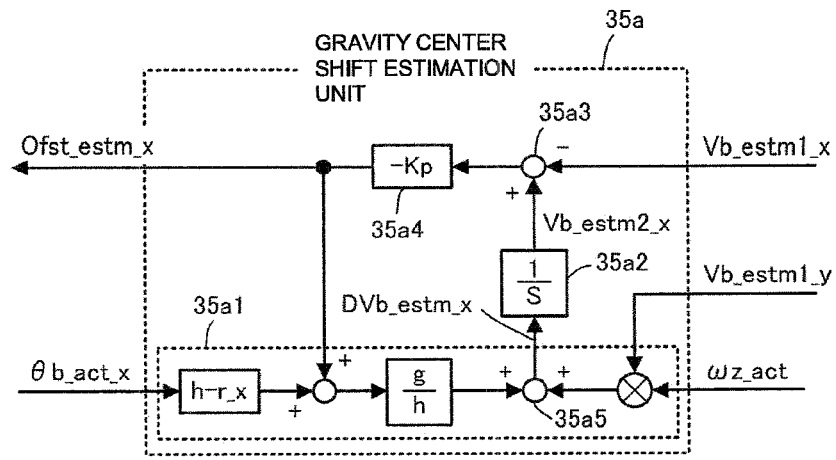
FIG. 8 is a block diagram showing processing of a center of gravity shift estimation unit shown in FIG. 5.

Processing of this center of gravity shift estimation unit 35a is processing shown by the block diagram of FIG. 8. Also, FIG. 8 typically shows the determining process of the center of gravity shift amount estimate value Ofst_estm_x in the X-axis direction out of the center of gravity shift amount estimate value Ofst_estm_xy. Further, in the description below, the estimate values Vb_estm1_x, Vb_estm1_y of the speed of the vehicle system entirety center of gravity calculated by the center of gravity speed estimation unit 33 may be referred to as a first estimate value Vb_estm1_x, Vb_estm1_y, respectively.

Processing of FIG. 8 will be described specifically. The center of gravity shift estimation unit 35a calculates the estimate value DVb_est_mx of the translational acceleration in the X-axis direction of the vehicle system entirety center of gravity by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system entirety center of gravity in the Y-axis direction calculated by the center of gravity speed estimation unit 33, and the center of gravity shift amount estimate value Ofst_est_mx (the value of the last time) in the X-axis direction determined at the calculation processing period of the last time.

Also the center of gravity shift estimation unit 35a calculates the second estimate value Vb_estm2_x of the speed of the vehicle system entirety center of gravity in the X axis direction by executing processing of integrating the estimate value DVb_estm_x of the translational acceleration in the X-axis direction of the vehicle system entirety center of gravity by a calculation unit 35a2.

Next, the center of gravity shift estimation unit 35a executes processing of calculating the deviation of the second estimate value Vb_estm2_x (newest value) of the speed of the vehicle system entirety center of gravity in the X-axis direction and the first estimate value Vb_estm1_x (the newest value) by a calculation unit 35a3.

Further, the center of gravity shift estimation unit 35a determines the newest value of the center of gravity shift amount estimate value Ofst_estm_x in the X-axis direction by executing processing of multiplying this deviation by a predetermined gain (−Kp) by a calculation unit 35a4.

Determining processing of the center of gravity shift amount estimate value Ofst_estm_y in the Y-axis direction is also executed similarly to the above. More specifically, the block diagram that shows this determining processing is obtained by replacing the suffixes "_x" and "_y" in FIG. 8 with each other and substituting "−" for the marks "+" of the acceleration component (the acceleration component generated by the centrifugal force) on the right side in the drawing that is one of the inputs to an adder 35a5.

By such processing of the center of gravity shift estimation unit 35a, Ofst_estm_xy can be determined so as to converge to an actual value by determining the center of gravity shift amount estimate value Ofst_estm_xy while updating it one by one.

Next, the first control processing unit 24 calculates the center of gravity shift effect amount Vofs_xy by executing processing of a center of gravity shift effect amount calculation unit 35b shown in FIG. 5.

The center of gravity shift effect amount Vofs_xy expresses the shift of the actual center of gravity speed with respect to the target speed of the vehicle system entirety center of gravity when feedback-control is executed in the attitude control calculation unit 34 described below without taking that the position of the vehicle system center of gravity of the entirety shifts from the position of the reference Ps_xy in the inverted pendulum model into consideration.

More specifically, this center of gravity shift effect amount calculation unit 35b calculates the center of gravity shift effect amount Vofs_xy by multiplying each component of the newly determined center of gravity shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system center of gravity of the entirety and the first estimate value Vb_estm1_xy of the speed of the vehicle system center of gravity of the entirety close to zero in processing of the attitude control calculation unit 34 described below.

Next, the first control processing unit 24 calculates a post-restriction center of gravity target speed Vb_cmd_xy based on the basic speed command Vjs_xy determined by the operation command conversion unit 31 and the center of gravity shift effect amount Vofs_xy determined by the center of gravity shift effect amount calculation unit 35b by executing processing of the center of gravity target speed determination unit 32 shown in FIG. 5.

First, the center of gravity target speed determination unit 32 executes processing of a processing unit 32c shown in FIG. 5. This processing unit 32c determines a target center of gravity speed adding amount Vb_cmd_by_ofs_xy as a component according to the shift of the center of gravity out of the target value of the speed of the vehicle system entirety center of gravity by executing dead zone processing and limiting processing in relation with the value of the center of gravity shift effect amount Vofs_xy.

More specifically, in the present embodiment, when the magnitude of the center of gravity shift effect amount Vofs_xy in the X-axis direction is a value within the dead zone that is a predetermined range in the vicinity of zero (a value comparatively near to zero), the center of gravity target speed determination unit 32 makes the target center of gravity speed adding amount Vb_cmd_by_ofs_xy in the X-axis direction zero.

Also, when the magnitude of the center of gravity shift effect amount Vofs_x in the X-axis direction is a value deviated from the dead zone, the center of gravity target speed determination unit 32 determines the target center of gravity speed adding amount Vb_cmd_by_ofs_x in the X-axis direction to be of a polarity same as that of Vofs_x and so that the magnitude thereof increases as the magnitude of Vofs_x increases. However, the value of the target center of gravity speed adding amount Vb_cmd_by_ofs_x is restricted to the range between predetermined upper limit value (>0) and lower limit value (≤0).

The determining process of the target center of gravity speed adding amount Vb_cmd_by_ofs_y in the Y-axis direction is also similar to the above.

Next, the center of gravity target speed determination unit 32 executes processing for determining the target speed V1_xy that is obtained by adding each component of the target center of gravity speed adding amount Vb_cmd_by_ofs_xy to each component of the basic speed command Vjs_xy which is determined by the operation command conversion unit 31 by a processing unit 32d shown in FIG. 5. That is, V1_xy (a set of V1_x and V1_y) is determined by processing of V1_x=Vjs_x+Vb_cmd_by_ofs_x, V1_y=Vjs_y+Vb_cmd_by_ofs_y.

Further, the center of gravity target speed determination unit 32 executes processing of a processing unit 32e. This processing unit 32e executes limiting processing for determining the post-restriction center of gravity target speed Vb_cmd_xy (a set of Vb_cmd_x and Vb_cmd_y) as the target speed of the vehicle system entirety center of gravity obtained by restricting combination of the target speed V1_x and V1_y in order that each rotational speed of the electric motor 8a, 8b as the actuator device 8 of the first moving motion unit 3 does not deviate from a predetermined allowable range.

In this case, when a set of the target speeds V1_x and V1_y obtained by the processing unit 32d exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction center of gravity target speed Vb_cmd_xy as it is.

Also when a set of the target speeds V1_x and V1_y obtained by the processing unit 32d deviates from the predetermined region on the coordination system, one restricted to a set on the boundary of the predetermined region is determined as the post-restriction center of gravity target speed Vb_cmd_xy.

As described above, because the center of gravity target speed Vb_cmd_xy is determined based on the basic speed command Vjs_xy and the center of gravity shift effect amount Vofs_xy (or the center of gravity shift amount), the occupant can steer the vehicle 1 by operation of the controller (operation of the joy stick 12) and by changing the attitude of the body of the occupant (movement of the body weight).

After executing processing of the center of gravity target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 5.

More specifically, first, the attitude control calculation unit 34 determines the target speed after center of gravity shift compensation Vb_cmpn_cmd_xy (newest value) by executing processing of reducing each component of the center of gravity shift effect amount Vofs_xy by a calculation unit 34b from each component of the post-restriction center of gravity target speed Vb_cmd_xy.

Next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34b and the calculation units excluding an integration calculation unit 34a that executes integration calculation by calculation of expressions (4a), (4b) below, respectively.

$$Dvw1\_cmd\_x=Kvb\_x\cdot(Vb\_cmpn\_cmd\_x-Vb\_estm1\_x)-Kth\_x\cdot\theta b\_act\_x-Kw\_x\cdot\omega b\_act\_x \quad (4a)$$

$$Dvw1\_cmd\_y=Kvb\_y\cdot(Vb\_cmpn\_cmd\_y-Vb\_estm1\_y)-Kth\_y\cdot\theta b\_act\_y-Kw\_y\cdot\omega b\_act\_y \quad (4b)$$

Kvb_xy, Kth_xy, Kw_xy in the expressions (4a), (4b) are control gains (hereinafter simply referred to as a gain) for motion control of the actuator device 8.

More specifically, Kvb_xy is a feedback control gain for executing motion control of the actuator device 8 (the electric motors 8a, 8b) according to the deviation of the target speed after center of gravity shift compensation Vb_cmpn_cmd_xy (newest value) and the first estimate value Vb_estm1_xy (newest value), and Kth_xy and Kw_xy are feedback control gains for executing motion control of the actuator device 8 (the electric motors 8a, 8b) according to the tilting state (the inclination angle and the inclination angular velocity) of the occupant riding section 5.

In a state where the occupant is riding on the occupant riding section 5 and the stand mechanism 81 is in OFF state (the state in which support of the vehicle 1 by the stand mechanism 81 is released), the values of these control gains Kvb_xy, Kth_xy, Kw_xy are predetermined gain values set beforehand.

However, although the detail will be described later, the control gains Kvb_xy, Kth_xy, Kw_xy are variably set under the situation the stepping on of the occupant to the occupant riding section 5 is executed and the situation the stepping off of the occupant from the occupant riding section 5 is executed.

Also, the first term of the right side of the expression (4a) is a feedback manipulated variable component according to the deviation of the target speed after center of gravity shift compensation Vb_cmpn_cmd_x (newest value) in the X-axis direction of the vehicle system entirety center of gravity and the first estimate value Vb_estm1_x (newest value), the second term is a feedback manipulated variable component according to the measured value (newest value) of the actual inclination angle θb_act_x in the direction around Y-axis of the occupant riding section 5, and the third term is a feedback manipulated variable component according to the measured value (newest value) of the actual inclination angular velocity ωb_act_x in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after center of gravity shift compensation Vb_cmpn_cmd_y (newest value) in the Y-axis direction of the vehicle system entirety center of gravity and the first estimate value Vb_estm1_y (newest value), the second term is a feedback manipulated variable component according to the measured value (newest value) of the actual inclination angle θb_act_y in the direction around X-axis of the occupant riding section 5, and the third term is a feedback manipulated variable component according to the measured value (newest value) of the actual inclination angular velocity ωb_act_y in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34a.

Also, the first control processing unit 24 controls the electric motors 8a, 8b as the actuator device 8 of the first moving motion unit 3 according to the first target speed Vw1_cmd_xy determined as described above. More specifically, the first control processing unit 24 determines the current command value of the each electric motor 8a, 8b by feedback control processing so that actual rotational speed (measured value) follows up the target value of the rotational speed of the each electric motor 8a, 8b decided by the first target speed Vw1_cmd_xy, and executes energization of the each electric motor 8a, 8b according to this current command value.

By the processing described above, in a state where the post-restriction center of gravity target speed Vb_cmd_xy is a constant value, motion of the vehicle 1 is settled, and the vehicle 1 is moving straight at a constant speed, the vehicle system entirety center of gravity exists just above the grounding point of the first moving motion unit 3. In this state, the actual inclination angle θb_act_xy of the occupant riding section 5 becomes −Ofst_xy/(h−r_xy) based on the expressions (1b), (2b). Also, the actual inclination angular velocity ωb_act_xy of the occupant riding section 5 becomes zero, and the target translational acceleration DVw1_cmd_xy becomes zero. From this fact and the block diagram of FIG. 5, agreement of Vb_estm1_xy and Vb_cmd_xy is derived.

The first target speed Vw1_cmd_xy of the first moving motion unit 3 is basically determined so that the deviation of the post-restriction center of gravity target speed Vb_cmd_xy and the first estimate value Vb_estm1_xy of the vehicle system entirety center of gravity converges to zero.

Also, each rotational speed of the electric motor 8a, 8b as the actuator device 8 of the first moving motion unit 3 is controlled so as not to deviate from a predetermined allowable range by processing of the processing unit 32e while compensating the effect of the event that the position of the vehicle system entirety center of gravity shifts from the position of the reference Ps_xy in the inverted pendulum model.

In addition, because Vb_cmpn_cmd_x=Vb_cmd_x−Vofs_x=Vb_cmd_x−(Kth_x/h−r_x)·(1/Kvb_x)·Ofst_estm_x and Vb_cmpn_cmd_y=Vb_cmd_y−Vofs_y=Vb_cmd_y−(Kth_y/h−r_y)·(1/Kvb_y)·Ofst_estm_y in the expressions (4a), (4b), the expressions (4a), (4b) can be rewritten to expressions (4a)', (4b)' below, respectively.

$$DVw1\_cmd\_x = Kvb\_x \cdot (Vb\_cmd\_x - Vb\_estm1\_x) - \\ Kth\_x \cdot (Ofst\_estm\_x/(h-r\_x) + \theta b\_act\_x) - Kw\_x \cdot \omega b\_act\_x \quad (4a)'$$

$$DVw1\_cmd\_y = Kvb\_y \cdot (Vb\_cmd\_y - Vb\_estm1\_y) - \\ Kth\_y \cdot (Ofst\_estm\_y/(h-r\_y) + \theta b\_act\_y) - Kw\_y' \omega b\_act\_y \quad (4b)'$$

In this case, the second term of the right side of the expressions (4a)', (4b)' has the meaning as the feedback manipulated variable component for bringing the actual position of the vehicle system entirety center of gravity in the X-axis direction and the Y-axis direction to the position just above the grounding part of the first moving motion unit 3.

Above is the detail of processing of the first control processing unit 24 in the present embodiment.

Next, processing of the second control processing unit 25 will be described referring to FIG. 9. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system entirety center of gravity or the first moving motion unit 3 or the motion state of the target, or the action state of the occupant in relation with the motion states.

In the present embodiment, as an indicator for determining presence/absence of the turning request or the degree of the turning request the estimate value Vb_estm1_y of the moving speed in the Y-axis direction of the vehicle system entirety center of gravity calculated by the center of gravity speed estimation unit 33 is used. Also, because Vb_estm1_y agrees to the moving speed in the Y-axis direction of the reference Ps_y, it has the meaning as the observed value of the moving speed in the Y-axis direction of the representative point fixed with respect to the occupant riding section 5 (or the base 2).

Further, when it is determined that there is a turning request, in order to make the vehicle 1 turn, the second control processing unit 25 determines the second target speed Vw2_cmd_y in the Y-axis direction of the second moving motion unit 4 so as to be different from the first target speed Vw1_cmd_y in the Y-axis direction of the first moving motion unit 3.

Such processing of the second control processing unit 25 is executed specifically as described below. That is, with reference to FIG. 9, first, the second control processing unit 25 executes processing of a processing unit 41. To the processing unit 41, the estimate value Vb_estm1_y (newest value) of the moving speed in the Y-axis direction of the vehicle system entirety center of gravity calculated by the center of gravity speed estimation unit 33 is inputted. Also, the processing unit 41 determines the speed after dead zone processing Vw1a_y according to Vb_estm1_y.

Here, when the occupant of the vehicle 1 intends to turn the vehicle 1 to the right or left, the occupant normally tries to shift the center of gravity of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the center of gravity of the occupant himself or herself may possibly shift to the right or left to some extent by drift of the upper body of the occupant.

Figure 9:
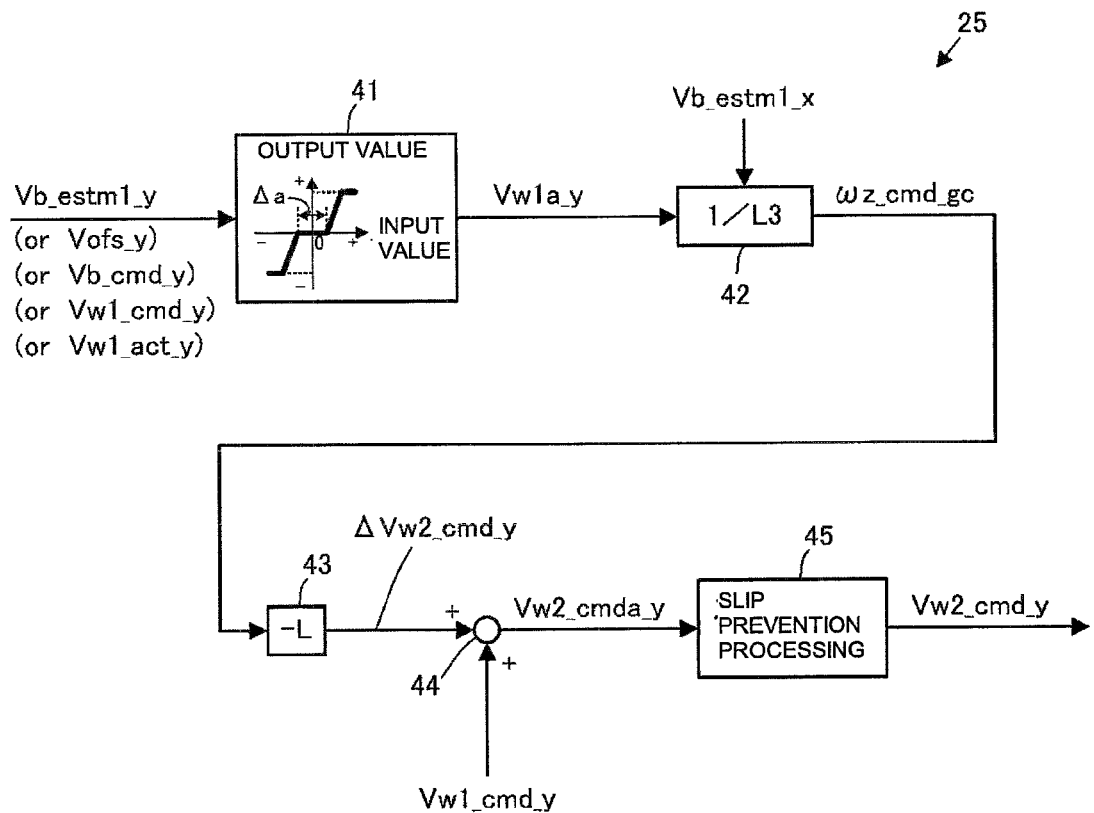
FIG. 9 is a block diagram showing processing of the second control processing unit shown in FIG. 4.

Therefore, by the characteristic of the graph shown in FIG. 9, the processing unit 41 determines the speed after dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying increase of the absolute value of Vb_estm1_y in the range of a predetermined upper limit value or less. In this case, the polarity (direction) of Vw1a_y is made same as that of Vb_estm1_y. As described below, in order to set the center of turning to a preferable position, the increase ratio of Vw1a_y with respect to increase of Vb_estm1_y is preferable to be 1. That is, in a region excluding the dead zone and the saturate region in the graph of FIG. 9, the inclination is preferable to be 1.

Also, in FIG. 9, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value Vb_estm1_x (newest value) of the actual moving speed in the X-axis direction of the vehicle system entirety center of gravity as the representative point of the vehicle 1.

Also, more specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when Vb_estm1_x is zero, the distance L3 in the X-axis direction between the center of tuning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

Also, when Vb_estm1_x is positive which is the case of moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of Vb_estm1_x increases. That is, L3 is set so as to reduce as the magnitude (absolute value) of Vb_estm1_x increases. However, L3 is restricted to a distance of a predetermined lower limit value (>0) or more.

Also, when Vb_estm1_x is negative which is the case of moving rearward, L3 is preferable to be set to be the same as a value of a case where Vb_estm1_x is zero, or to increase as the magnitude (absolute value) of Vb_estm1_x increases.

The processing unit 42 determines the target turning angular velocity ωz_cmd_gc by dividing Vw1a_y by the distance L3 that is determined thus according to Vb_estm1_x. Also, ωz_cmd_gc is the angular velocity of the left turn (counterclockwise) when Vw1a_y is the leftward velocity, and is the angular velocity of the right turn (clockwise) when Vw1a_y is the rightward velocity.

Next, the second control processing unit 25 executes processing of a processing unit 43. The processing unit 43 calculates the relative moving speed ΔVw2_cmd_y in the Y-axis direction of the second moving motion unit 4 with respect to the first moving motion unit 3 in a case where the vehicle 1 turns at the target turning angular velocity ωz_cmd_gc by multiplying the target turning angular velocity ωz_cmd_gc determined by the processing unit 42 by a value (=−L) of (−1) times of a predetermined distance between the grounding part of the first moving motion unit 3 and the grounding part of the second moving motion unit 4.

In a case of ωz_cmd_gc=0 (in a case where there is no turning request), the relative moving speed ΔVw2_cmd_y in the Y-axis direction of the second moving motion unit 4 thus determined becomes zero. Also, ΔVw2_cmd_y is the rightward velocity when ωz_cmd_gc is the turning angular velocity of the left turn, and is the leftward velocity when ωz_cmd_gc is the turning angular velocity of the right turn. Therefore, ΔVw2_cmd_y of a case where there is a turning request is the velocity of the direction opposite to that of Vw1a_y or Vb_estm1_y.

Next, the second control processing unit 25 executes processing of a processing unit 44. This processing unit 44 determines the basic value Vw2_cmda_y (newest value) of the second target speed Vw2_cmd_y in the Y-axis direction of the second moving motion unit 4 by adding the relative moving speed ΔVw2_cmd_y in the Y-axis direction of the second moving motion unit 4 to the first target speed Vw1_cmd_y (newest value) in the Y-axis direction of the first moving motion unit 3 determined by the first control processing unit 24.

Next, the second control processing unit 25 executes processing of a processing unit 45. This processing unit 45 determines the second target speed Vw2_cmd_y in the Y-axis direction of the second moving motion unit 4 by executing slip preventing processing for preventing slip of the second moving motion unit 4.

In this case, when slip of the second moving motion unit 4 is anticipated to be liable to occur, for example, in the case where the absolute value of the basic value Vw2_cmda_y is excessively large, the processing unit 45 sets the second target speed Vw2_cmd_y in the Y-axis direction of the second moving motion unit 4 to a speed that is corrected from the basic value Vw2_cmda_y. Also, when slip of the second moving motion unit 4 is not anticipated to occur, the processing unit 45 determines the basic value Vw2_cmda_y as it is as the second target speed Vw2_cmd_y in the Y-axis direction of the second moving motion unit 4.

Further, when the friction force between the second moving motion unit 4 and the floor surface can be secured sufficiently, for example, in the case where the second moving motion unit 4 is pressed to the floor surface by a spring and the like, processing of the processing unit 45 may be omitted.

Also, the second control processing unit 25 controls the electric motor 17 as the actuator device of the second moving motion unit 4 according to the second target speed Vw2_cmd_y determined as described above. More specifically, the second control processing unit 25 determines the current command value of the electric motor 17 by feedback control processing so that the actual rotational speed (measured value) follows up the target value of the rotational speed of the electric motor 17 decided by the second target speed Vw2_cmd_y, and executes energization of the electric motor 17 according to this current command value.

Control processing of the second control processing unit 25 is executed as described above. Thus, the second target speed Vw2_cmd_y in the Y-axis direction of the second moving motion unit 4 is determined basically to a speed obtained by adding the relative moving speed ΔVw2_cmd_y to the first target speed Vw1_cmd_y (newest value) in the Y-axis direction of the first moving motion unit 3.

In this case, under the situation that the absolute value of the estimate value Vb_estm1_y of the moving speed in the Y-axis direction of the vehicle system entirety center of gravity is small enough and it is determined that there is no turning request, ΔVw2_cmd_y=0 is resulted, and therefore the second target speed Vw2_cmd_y in the Y-axis direction of the second moving motion unit 4 is basically determined so as to agree to the first target speed Vw1_cmd_y in the Y-axis direction of the first moving motion unit 3.

On the other hand, under the situation that the absolute value of the estimate value Vb_estm1_y of the moving speed in the Y-axis direction of the vehicle system entirety center of gravity is comparatively large and it is determined that there is a turning request, ΔVw2_cmd_y is determined to a velocity with the direction opposite to that of Vb_estm1_y. Therefore, the second target speed Vw2_cmd_y in the Y-axis direction of the second moving motion unit 4 is basically determined to a velocity with the direction same as that of the first target speed Vw1_cmd_y in the Y-axis direction of the first moving motion unit 3 and with a magnitude smaller than that of Vw1_cmd_y (a velocity of zero or near to zero), or is determined to a velocity with the direction opposite to that of the first target speed Vw1_cmd_y in the Y-axis direction of the first moving motion unit 3.

In the vehicle 1 of the present embodiment described above, translational movement of the vehicle 1 in the X-axis direction can be executed according to the advancing/retreating command outputted according to tilting in the front/rear direction (the X-axis direction) of the occupant riding section 5 (or base 2) accompanying movement of the body of the occupant riding on the occupant riding section 5 or according to the swing operation in the front/rear direction of the joy stick 12 in a state where the occupant rides on the occupant riding section 5, the stand mechanism 81 is in OFF state, and support of the vehicle 1 by the stand mechanism 81 is released.

Also, under such situation that movement in the right/left direction of the center of gravity of the occupant himself or herself riding on the occupant riding section 5 (relative movement with respect to the occupant riding section 5) is comparatively small and the estimate value Vb_estm1_y of the moving speed in the Y-axis direction of the vehicle system entirety center of gravity falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Further, combining these translational movements, translational movement of the vehicle 1 can be executed also in an optional direction oblique with respect to the X-axis direction and the Y-axis direction.

Also, when the estimate value Vb_estm1_y of the moving speed in the Y-axis direction of the vehicle system entirety center of gravity deviates from the predetermined range Δa in the vicinity of zero because the occupant riding on the occupant riding section 5 moves the center of gravity of the occupant himself or herself comparatively largely in the right/left direction, the second target speed Vw2_cmd_y in the Y-axis direction of the second moving motion unit 4 is determined to a speed shifted from the first target speed Vw1_cmd_y in the Y-axis direction of the second moving motion unit 4 by ΔVw2_cmd_y. Further, in this case, the second target speed Vw2_cmd_y is determined to such speed that makes the vehicle 1 turn around the center of turning on the rear side of the grounding part of the first moving motion unit 3.

Therefore, the occupant can turn the vehicle 1 only by moving the upper body so as to move the center of gravity of the occupant himself or herself in the right/left direction. Also, in this case, the vehicle 1 turns in the left when the occupant moves the center of gravity of the occupant himself or herself to the left, and the vehicle 1 turns in the right when the occupant moves the center of gravity of the occupant himself or herself to the right. Accordingly, the movement of the center of gravity of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

Also, for example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction), and therefore a large friction force can be prevented from applying to the first moving motion unit 3. Accordingly, turning (direction change) of the vehicle 1 can be executed smoothly.

Also, when the vehicle 1 is to be turned while the vehicle 1 is moved to the forward direction (the positive direction of X-axis), as the magnitude (absolute value) of the estimate value Vb_estm1_x of the moving speed in the X-axis direction of the vehicle system center of gravity of the entirety as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

Also, in the present embodiment, the center of gravity shift estimation unit 35a of the first control processing unit 24 estimates the center of gravity shift amount Ofst_xy of the vehicle system center of gravity of the entirety by processing shown in FIG. 8. Therefore, the center of gravity shift amount can be estimated accurately. Also, as described above, according to the estimate value Ofst_estm_xy of this center of gravity shift amount Ofst_xy, the target speed (post-restriction center of gravity target speed) Vb_cmd_xy of the vehicle system entirety center of gravity is determined. Therefore, the effect exerted to the behavior of the vehicle 1 by the center of gravity shift amount Ofst_xy can be properly compensated.

Next, the action in the stepping on of the occupant to the occupant riding section 5 and the action in the stepping off of the occupant from the occupant riding section 5 will be described.

Figure 10:
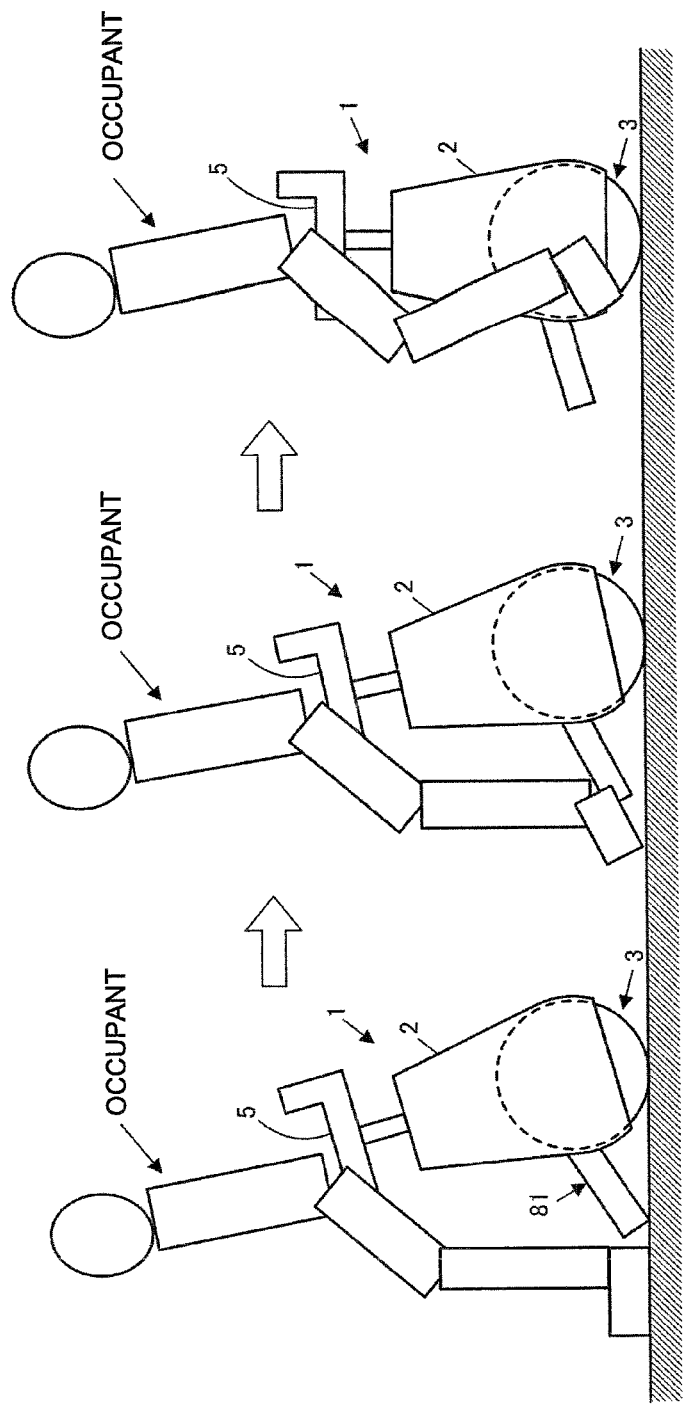
FIGS. 10(a), 10(b) and 10(c) are drawings schematically showing the action state at the time of the stepping on to the occupant riding section of the inverted pendulum type vehicle.

In the vehicle 1 of the present embodiment, for example, the stepping-on action of the occupant to the occupant riding section 5 is executed as described below. That is, the stepping-on action of the occupant is started by the sitting of the occupant on the occupant riding section 5 as shown in FIG. 10(a) in the stop support state that is a state in which the vehicle 1 is supported by the stand mechanism 81 in ON state and stops (the state shown in FIG. 3). In this case, because the occupant riding section 5 and the base 2 are in a forward inclined state in the stop support state (and the height of the occupant riding section 5 is lower than that in the support release reference riding state described below), the occupant can start the stepping-on action easily. Also, in FIG. 10, the vehicle 1 is patterned and is illustrated simply.

Next, the occupant puts on the power source of the vehicle 1, and makes the stand mechanism 81 the OFF state by a predetermined operation. Also, as shown in FIG. 10(b), the occupant moves the upper body of the occupant himself or herself so that the vehicle system entirety center of gravity is positioned above the grounding part of the first moving motion unit 3 while eliminating forward inclination of the occupant riding section 5 and the base 2.

Thus, eventually, the state of the vehicle 1 shifts to the support release reference riding state that is a state in which the occupant rides on the occupant riding section 5 in the reference attitude state and support of the vehicle 1 by the stand mechanism 81 is released as shown in FIG. 10(c).

Also, the reference attitude state of the occupant means a state in which the vehicle system entirety center of gravity is maintained at a position generally just above the grounding part of the first moving motion unit 3 (more specifically, the action center of the grounding load (so-called floor reaction force center)).

Further, when the occupant is to step off from the occupant riding section 5, movement of the upper body of the occupant and operation of the stand mechanism 81 are executed so that the state of the vehicle 1 is shifted from the support release reference riding state to the stop support state reversely to the time of the stepping on to the occupant riding section 5.

When the stepping-on action of the occupant to the occupant riding section 5 as described above is executed and when the stepping-off action of the occupant from the occupant riding section 5 as described above is executed, the first control processing unit 24 and the second control processing unit 25 execute control processing same as controlling processing described above (processing of movement control of the first moving motion unit 3 and the second moving motion unit 4).

However, when the stepping-on action or the stepping-off action of the occupant is to be executed, the control gain adjustment unit 26 of the first control processing unit 24 variably sets the control gains Kvb_xy, Kth_xy, Kw_xy which are used in calculation processing of the attitude control calculation unit 34 (calculation processing of the expressions (4a), (4b)).

More specifically, the control gain adjustment unit 26 determines first gain adjustment parameters K1_x, K1_y for adjusting the magnitude (absolute value) of the control gains Kth_xy, Kw_xy successively according to the measured value (newest value) of the actual inclination angle θb_act_x in the direction around Y-axis of the occupant riding section 5 (or the base 2), and determines a second gain adjustment parameter K2 successively according to the measured value (newest value) of the actual inclination angle θb_act_y in the direction around X-axis of the occupant riding section 5 (or the base 2).

The parameter K1_x out of the first gain adjustment parameters K1_x, K1_y is a parameter for adjusting the magnitude of the control gains Kvb_x, Kth_x, Kw_x in relation with movement control of the first moving motion unit 3 in the X-axis direction, and the parameter K1_y is a parameter for adjusting the magnitude of the control gains Kvb_y, Kth_y, Kw_y in relation with movement control of the first moving motion unit 3 in the Y-axis direction.

Also, in the present embodiment, the control gain adjustment unit 26 determines whether it is in the situation in which the stepping on of the occupant to the occupant riding section 5 is executed or in the situation in which the stepping off of the occupant from the occupant riding section 5 is executed based on the output of the stand sensor 90.

For example, when the stand mechanism 81 is recognized to have been switched from the ON state to the OFF state by the output of the stand sensor 90, it is determined to be in the situation in which the stepping on of the occupant to the occupant riding section 5 is executed. Also, when the stand mechanism 81 is recognized to have been switched from the OFF state to the ON state by the output of the stand sensor 90, the control gain adjustment unit 26 determines that it is in the situation in which the stepping off of the occupant from the occupant riding section 5 is executed.

Further, the control gain adjustment unit 26 determines the control gains Kvb_x(=Kvb0_x·K1_x·K2), Kth_x (=Kth0_x·K1_x·K2), Kw_x(=Kw0_x·K1_x·K2) respectively by multiplying previously determined reference values Kvb0_x, Kth0_x, Kw0_x of the control gains Kvb_x, Kth_x, Kw_x in relation with moving control of the first moving motion unit 3 in the X-axis direction by the first gain adjustment parameter K1_x and the second gain adjustment parameter K2.

Also, the control gain adjustment unit 26 determines the control gains Kvb_y(=Kvb0_y·K1_y·K2), Kth_y (=Kth0_y·K1_y·K2), Kw_y(=Kw0_y·K1_y·K2) respectively by multiplying previously determined reference values Kvb0_y, Kth0_y, Kw0_y of the control gains Kvb_y, Kth_y, Kw_y in relation with moving control of the first moving motion unit 3 in the Y-axis direction by the first gain adjustment parameter K1_y and the second gain adjustment parameter K2.

Further, the control gains Kvb_y, Kth_y, Kw_y correspond to the first control gain in the present invention, and the control gains Kvb_x, Kth_x, Kw_x correspond to the second control gain in the present invention.

The control gains Kvb_xy, Kth_xy, Kw_xy determined as described above are used in calculation processing of the attitude control calculation unit 34.

Figure 11:
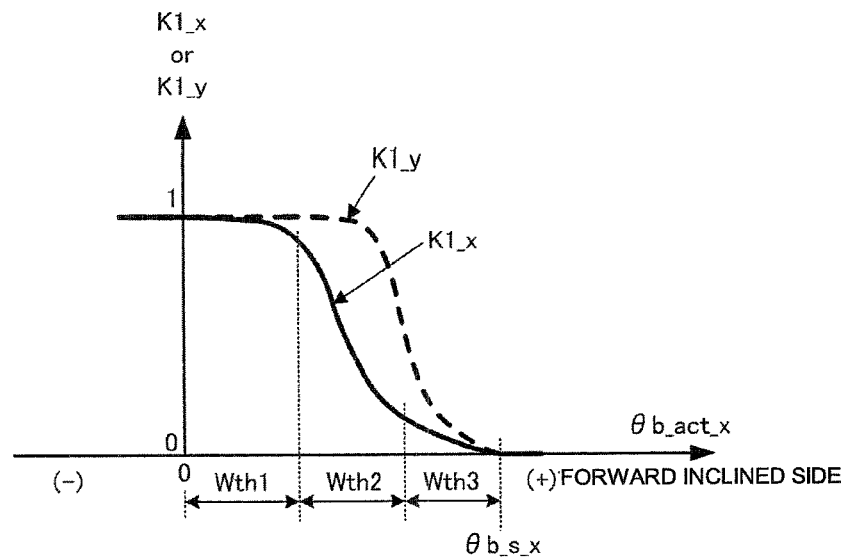
FIG. 11 is a graph for explaining processing of the control gain adjustment unit shown in FIG. 4.

In this case, the first gain adjustment parameters K1_x, K1_y are determined by a map or a calculation formula set beforehand according to the measured value of θb_act_x by a characteristic as shown in the graph of FIG. 11 for example. More specifically, both of the first gain adjustment parameters K1_x, K1_y are made zero when θb_act_x is a positive inclination angle (an inclination angle on the forward inclined side) of equal to or larger than an inclination angle θb_s_x of a predetermined value determined beforehand as the inclination angle of the occupant riding section 5 in the stop support state of the vehicle 1. Also, the first gain adjustment parameters K1_x, K1_y are determined so as to increase from zero to "1" as θb_act_x approaches the inclination angle in the support release reference riding state of the vehicle 1 (=0) from θb_s_x.

Also, the inclination angle θb_s_x of the occupant riding section 5 in the stop support state and the inclination angle (=0) of the occupant riding section 5 in the support release reference riding state correspond to the first inclination angle and the second inclination angle in the present invention, respectively.

In this case, the parameter K1_x is determined so that the magnitude of the change amount of the value of K1_x per unit change amount of θb_act_x (that is the inclination of the graph of the solid line of FIG. 11) of a case in which θb_act_x is an angle in an intermediate angle range between zero and θb_s_x (the angle range of Wth2 of FIG. 11 for example) is larger than that of a case in which θb_act_x is an angle in an angle range closer to zero (Wth1 of FIG. 11 for example) or in an angle range closer to θb_s_x (Wth3 of FIG. 11 for example). This is similar also with respect to the parameter K1_y.

Further, the values of K1_x, K1_y are determined so that, when the characteristics of change of the parameters K1_x, K1_y accompanying that θb_act_x approaches zero from θb_s_x are compared to each other, the value of the parameter K1_y approaches "1" earlier in an angle range closer to θb_s_x than the value of the parameter K1_x does.

In other words, the angle range of θb_act_x where the change amount of the value of K1_y per unit change amount of θb_act_x becomes comparatively large is made an angle range closer to θb_s_x than the angle range where the change amount of the value of K1_x per unit change amount of θb_act_x becomes comparatively large.

Figure 12:
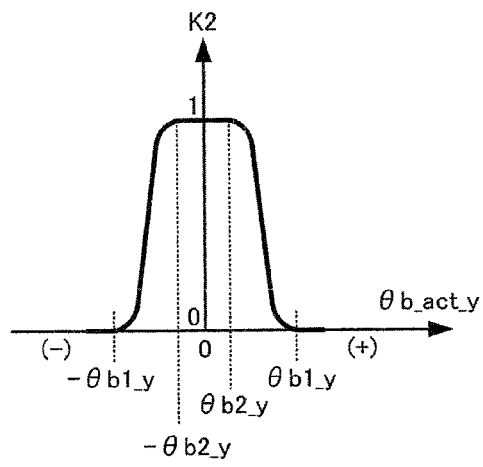
FIG. 12 is a graph for explaining processing of the control gain adjustment unit shown in FIG. 4.

Also, the second gain adjustment parameters K2 is determined by a map or a calculation formula set beforehand according to the measured value of θb_act_y by a characteristic as shown in the graph of FIG. 12 for example. That is, the second gain adjustment parameter K2 is made zero when the absolute value of θb_act_y is a value in an angle range of the first predetermined value θb1_y or more, and is made "1" in an angle range where the absolute value is the second predetermined value θb2_y or less. Further, when the absolute value of θb_act_y is a value in an angle range of θb2_y<|θb_act_y|<θb1_y, the value of K2 is determined so as to increase from zero to "1" as the absolute value of θb_act_y approaches zero.

Also, when the stepping on of the occupant to the occupant riding section 5 or the stepping off of the occupant from the occupant riding section 5 is executed, the inclination angle θb_act_y of the occupant riding section 5 in the direction around X-axis is normally maintained at zero or an angle near it. Therefore, the second gain adjustment parameter K2 normally comes to be determined at "1" or a value near it.

Because the control gains Kvb_xy, Kth_xy, Kw_xy are determined as described above, when the state of the vehicle 1 is the stop support state or the state near it in a case the stepping on of the occupant to the occupant riding section 5 or the stepping off of the occupant from the occupant riding section 5 is executed, the control gains Kvb_xy, Kth_xy, Kw_xy are respectively determined to zero or a value near it.

Therefore, in a state where the state of the vehicle 1 is the stop support state or the state near it, such event is prevented that the first moving motion unit 3 automatically moves with high sensitivity according to tilting of the occupant riding section 5 and the base 2. Therefore, it becomes easy for the occupant to move the upper body and the like of the occupant himself or herself. As a result, movement of the upper body and the like of the occupant himself or herself (and movement of the center of gravity of the occupant himself or herself) so as to shift the state of the vehicle 1 from the stop instruction state to the support release reference riding state in the stepping on or to shift the state of the vehicle 1 from the support release reference riding state to the stop instruction state in the stepping off can be executed smoothly.

Also, when the state of the vehicle 1 becomes a state near the support release reference riding state, the magnitude (absolute value) of the control gains Kvb_xy, Kth_xy, Kw_xy respectively become the reference values Kvb0_x, Kth0_x, Kw0_x or of values near them which are comparatively large. Therefore, to control movement of the first moving motion unit 3 so that the inclination angle θb_act_xy of the occupant riding section 5 and the base 2 is maintained to zero that is the angle in the support release reference riding state in a state near the support release reference riding state particularly at the time of the stepping on of the occupant to the occupant riding section 5 is executed with high sensitivity. Also, the attitude of the occupant riding section 5 and the base 2 or the attitude of the occupant is prevented from staggering in the support release reference riding state.

Further, because the first gain adjustment parameters K1_x, K1_y are determined as described above, with respect to the control gains Kvb_y, Kth_y, Kw_y in relation with movement control of the first moving motion unit 3 in the Y-axis direction, the angle range of the inclination angle θb_act_x of the occupant riding section 5 in the direction around Y axis where the values thereof become the reference values Kvb0_y, Kth0_y, Kw0_y or values near them is closer to the inclination angle θb_s_x in the stop support state than that of the control gains Kvb_x, Kth_x, Kw_x in relation with movement control of the first moving motion unit 3 in the X-axis direction.

Therefore, the occupant riding section 5 can be prevented from staggering to the left and right in a state other than near the starting time of the stepping in action of the occupant to the occupant riding section 5 or near the finishing time of the stepping-off action of the occupant from the occupant riding section 5.

In addition, in the present embodiment, when the occupant riding section 5 and the base 2 become the rearward inclined state in the middle of the stepping off at the time of the stepping off of the occupant from the occupant riding section 5, the control gain adjustment unit 26 immediately forcibly increases the magnitude of each of the control gains Kvb_xy, Kth_xy, Kw_xy or the control gains Kvb_x, Kth_x, Kw_x in relation with movement control of the first moving motion unit 3 in the X-axis direction. Thus, even when the occupant riding section 5 and the base 2 become the rearward inclined state in the middle of the stepping off, the rearward inclined state is eliminated quickly.

Also, when the moving speed of the first moving motion unit 3 discontinuously increases (when the moving speed of the first moving motion unit increases at a temporal change rate of a predetermined value or more) due to jumping off of the occupant from the occupant riding section 5 in the middle of the stepping off at the time of the stepping off of the occupant from the occupant riding section 5, the control gain adjustment unit 26 immediately forcibly increases the magnitude of each of the control gains Kvb_xy, Kth_xy, Kw_xy. Thus, the attitude of the occupant riding section 5 and the base 2 can be stabilized quickly.

In each case of the time of the stepping on and the time of the stepping off of the occupant, control processing of the notification control unit 93 is also executed in parallel to execution of processing of the control gain adjustment unit 26 as described above.

More specifically, in each case of stepping on and stepping off of the occupant, the notification control unit 93 notifies the occupant of the attitude state of the vehicle 1 by controlling the LED display 91 and the speaker 92 according to the attitude state. For example, whether or not the state of the vehicle 1 is in the stop support state, in the support release reference riding state, or in the middle state between these states is notified.

In this case, by changing the luminescent color, the flickering state and the like of the LED display 91 and changing the tone color, the sound volume, the sound content and the like of the speaker 92, the attitude state of the vehicle 1 is notified to the occupant. Also, notification only by either one of the LED display 91 and the speaker 92 may be executed. Or otherwise, it is also possible to execute physically sensational notification by vibration and the like of the occupant riding section 5.

By executing such notification, the occupant can execute the stepping-on action or the stepping-off action while recognizing the attitude state of the vehicle 1 in each case of stepping on and stepping off of the occupant.

Next, the second embodiment and the third embodiment of the present invention will be described respectively referring to FIG. 13(a) and FIG. 13(b). Also, the second embodiment and the third embodiment are different from the first embodiment with respect to only a part of processing of the second control processing unit 25. Therefore, in the description of the second embodiment and the third embodiment, the description of items same as those of the first embodiment will be omitted.

Also, in FIGS. 13(a) and 13(b), the reference signs in parentheses relate to the modifications described below.

Figure 13A:
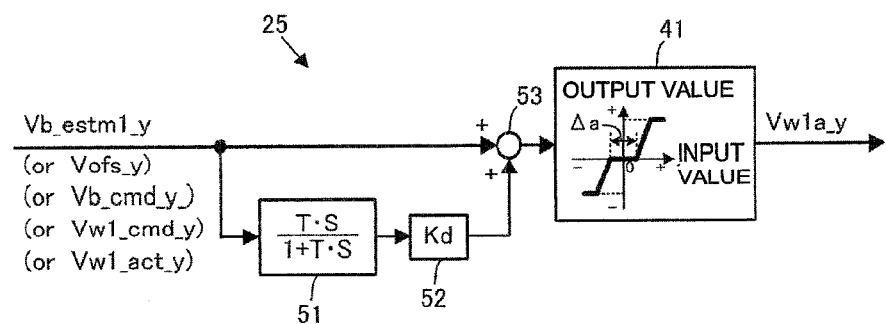
FIGS. 13(a) and 13(b) are block diagrams showing processing of essential parts of the second control processing unit in the second embodiment and the third embodiment of the present invention respectively.

FIG. 13(a) shows processing in which the second control processing unit 25 determines Vw1a_y (the target value of the speed after dead zone processing) according to the estimate value Vb_estm1_y of the moving speed in the Y-axis direction of the vehicle system entirety center of gravity in the second embodiment.

In this second embodiment, the second control processing unit 25 includes a low-cut filter (pseudo-differentiation filter) 51 to which the estimate value Vb_estm1_y of the moving speed in the Y-axis direction of the vehicle system entirety center of gravity is inputted. The second control processing unit 25 adds a value obtained by multiplying the output of the low-cut filter 51 (a value obtained by subjecting Vb_estm1_y to filtering processing of a low-cut characteristic) by the gain Kd of a predetermined value by a processing unit 52 to Vb_estm1_y by a calculation unit 53.

Also, the second control processing unit 25 inputs the output of the calculation unit 53 to the processing unit 41 the same as that of the first embodiment instead of inputting Vb_estm1_y, executes processing of the processing unit 41 in a similar manner as done in the first embodiment, and thereby determines Vw1a_y. That is, Vw1a_y is equivalent to one obtained by passing Vb_estm1_y through a phase compensation circuit (filter).

The second embodiment is the same as the first embodiment with respect to the items other than those described above.

In such second embodiment, Vw1a_y and the target turning angular velocity ωz_cmd_gc are determined according to the phase compensation value of the estimate value Vb_estm1_y of the moving speed in the Y-axis direction of the vehicle system entirety center of gravity (the output of the calculation unit 53) and the output of the low-cut filter 51 which becomes one according to the temporal change rate thereof.

Therefore, the response of the turning behavior of the vehicle 1 can be improved with respect to movement in the Y-axis direction of the vehicle system entirety center of gravity accompanying movement of the upper body of the occupant.

Figure 13B:
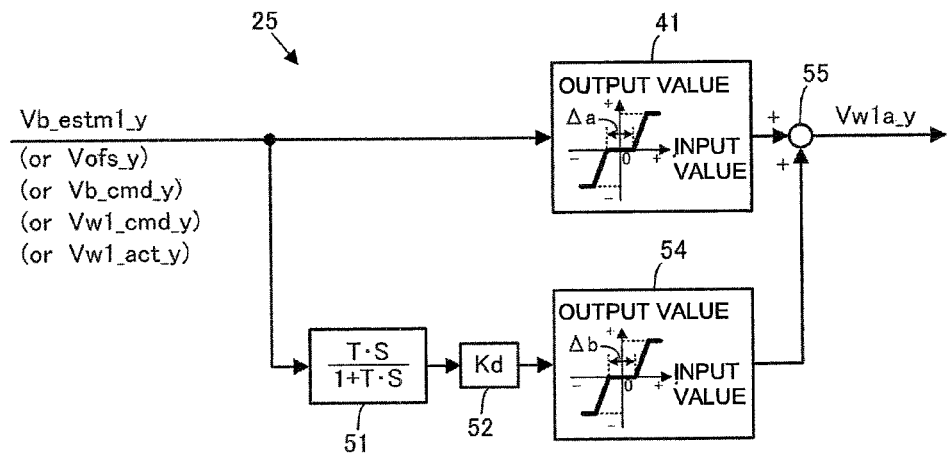

Next, FIG. 13(b) shows processing in which the second control processing unit 25 determines Vw1a_y (the target value of the speed after dead zone processing) according to the estimate value Vb_estm1_y of the moving speed in the Y-axis direction of the vehicle system entirety center of gravity in the third embodiment.

In this third embodiment, similarly to the first embodiment, the estimate value Vb_estm1_y of the moving speed in the Y-axis direction of the vehicle system center of gravity of the entirety is configured to be inputted to the processing unit 41.

Also, in the third embodiment, in addition to including the low-cut filter 51 and the processing unit 52 which are the same as those of the second embodiment, the second control processing unit 25 further includes a processing unit 54 that inputs the output of the processing unit 52. This processing unit 54 executes processing similar to that of the processing unit 41.

More specifically, when the absolute value of the input value of the processing unit 54 is comparatively small and the input value is a value within a predetermined range Δb with zero taken in the center (when the absolute value of the input value is equal to or less than a predetermined value determined beforehand), the processing unit 54 makes the output value zero.

Also, when the absolute value of the input value of the processing unit 54 is comparatively large and the input value is a value out of the predetermined range b (when the absolute value of the input value is larger than the predetermined value determined beforehand), the processing unit 54 sets the output value to a value that is not zero.

More specifically, the processing unit 54 determines the output value according to the input value of the processing unit 54 so that the absolute value of the output value thereof increases accompanying increase of the absolute value of the input value of the processing unit 54 in the range of a predetermined upper limit value or less. In this case, the polarity (direction) of the output value of the processing unit 54 is made same as that of the input value.

Also, the second control processing unit 25 in the third embodiment determines Vw1a_y by adding the output value of the processing unit 41 and the output value of the processing unit 54 by a calculation unit 55.

The third embodiment is the same as the first embodiment with respect to the items other than those described above.

In the third embodiment, Vw1a_y is determined by adding a component determined by the processing unit 41 according to the estimate value Vb_estm1_y of the moving speed in the Y-axis direction of the vehicle system entirety center of gravity and a component determined by the processing unit 54 according to the output of the low-cut filter 51 which becomes one according to the temporal change rate of Vb_estm1_y.

Therefore, similarly to the second embodiment, response of the turning behavior of the vehicle 1 can be improved with respect to movement in the Y-axis direction of the vehicle system center of gravity of the entirety accompanying movement of the upper body of the occupant.

Next, some of modifications of the respective embodiments described above will be described.

In the respective embodiments described above, in order to variably determine the control gains Kvb_xy, Kth_xy, Kw_xy, instead of both or either one of the first gain adjustment parameters K1_x, K1_y and the second gain adjustment parameter K2, a map deciding the relation between both or either one of the inclination angle θb_act_x and θb_act_y of the occupant riding section 5 and the control gains Kvb_xy, Kth_xy, Kw_xy may be used. For example, each of the control gains Kvb_xy, Kth_xy, Kw_xy may be determined using a two-dimensional map from θb_act_x and θb_act_y.

Also, the control gains Kvb_xy, Kth_xy, Kw_xy may be determined so as to be differentiated between the case where the stepping on of the occupant to the occupant riding section 5 is executed and the case where the stepping off of the occupant from the occupant riding section 5 is executed.

Also, the stand mechanism 81 having a structure different from that described in the first embodiment may be employed.

Further, it is also possible that the stand mechanism 81 is not included in the vehicle 1, a support mechanism separate from the vehicle 1 is arranged in a proper position on the floor surface, and the vehicle 1 is supported and stopped by the support mechanism.

Also, in the stop support state of the vehicle 1, the vehicle 1 may be supported by a support mechanism such as a stand mechanism in the attitude in which the occupant riding section 5 is inclined in the direction around X-axis.

Further, in the respective embodiments described above, in processing of the second control processing unit 25, as an indicator for determining presence/absence of the turning request or the degree of the turning request, the estimate value Vb_estm1_y of the moving speed in the Y-axis direction of the vehicle system center of gravity of the entirety calculated by the center of gravity speed estimation unit 33 was used. However, as the indicator for determining presence/absence of the turning request or the degree of the turning request, a parameter other than Vb_estm1_y may be used.

For example, the target turning angular velocity ωz_cmd_gc of the vehicle 1 may be determined by executing processing of the processing units 41, 42 similarly to the embodiments described above using the center of gravity shift effect amount Vofs_y (or the center of gravity shift amount estimate value Ofst_estm_y) in the Y-axis direction calculated by the center of gravity shift effect amount calculation unit 35b of the first control processing unit 24, or the post-restriction center of gravity target speed Vb_cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b) instead of Vb_estm1_y as shown in the reference signs in parentheses of FIG. 9 or FIGS. 13(a) and 13(b).

Also, in this case, in the processing unit 41, the range Δa (the magnitude of the upper limit value and the lower limit value of the range Δa) of the value of the input parameter that makes the output value of the processing unit 41 zero and the change rate of the output value with respect to change in the value of the input parameter outside the range Δa are set for each of the various input parameters in general. This is similar also in the processing unit 54 shown in FIG. 13(b).

Even when such parameters as described above that substitute for Vb_estm1_y are used, similarly to the embodiments described above, the vehicle 1 can be turned according to movement in the right/left direction of the upper body of the occupant.

When the center of gravity shift effect amount Vofs_y in the Y-axis direction calculated by the center of gravity shift effect amount calculation unit 35b of the first control processing unit 24 is used instead of Vb_estm1_y, because the Vofs_y is proportionate to the center of gravity shift amount estimate value Ofst_estm_y in the Y-axis direction, to set the target turning angular velocity ωz_cmd_gc of the vehicle 1 according to Vofs_y is equivalent to set the target turning angular velocity ωz_cmd_gc of the vehicle 1 according to the center of gravity shift amount estimate value Ofst_estm_y in the Y-axis direction.

Also, in the respective embodiments described above, the distance L3 between the center of turning in turning of the vehicle 1 and the grounding part of the first moving motion unit 3 was changed according to the estimate value (observed value) Vb_estm_x of the moving speed in the front/rear direction of the vehicle system entirety center of gravity, however, L3 may be made a constant value determined beforehand.

Further, in the first embodiment, the target turning angular velocity ωz_cmd_gc was set to zero when the estimate value Vb_estm1_y of the moving speed in the Y-axis direction of the vehicle system entirety center of gravity as the input parameter of the processing unit 41 was a value within the predetermined range Δa in the vicinity of zero, however, the target turning angular velocity ωz_cmd_gc may be set so as to turn the vehicle 1 even when the input parameter is a value within the predetermined range Δa. That is, Δa may be made zero.

Also, in the respective embodiments described above, although one in which the second moving motion unit 4 was disposed on the rear side of the first moving motion unit 3 was shown, the second moving motion unit 4 may be disposed on the front side of the first moving motion unit 3, for example.

In each embodiment, the control device 21 may be configured so as to lower the steering sensitivity of the vehicle 1 in the warming up period from start of the vehicle 1 until a constant time elapses compared to that in the normal operation period thereafter. In order to lower the steering sensitivity of the vehicle 1, for example, the dead zone of the processing unit 32c (refer to FIG. 5) of the center of gravity target speed determination unit 32 forming the first control processing unit 24 is widened temporarily in the warming up period. Thus, the situation wherein the vehicle 1 starts to move in the warming up period can be avoided.

The control device 21 may be configured so as to lower the steering sensitivity of the vehicle 1 intermittently or continuously when abnormality is detected in the vehicle 1. Thus, such a situation is avoided wherein the damage increases because the vehicle 1 is still used continuously even if an abnormality occurs in the vehicle 1. The control device 21 may be configured so as to display presence/absence of abnormality detection or the kind of abnormality on the indicator or to make a speaker output the same by sound.

As the abnormality, a system error such as noise-originated communication abnormality of the control device 21, significant drop of the storage quantity of the on-vehicle battery, overheat of a constituting component of the vehicle 1, excessive supply current to electric equipment that is a constituting component of the vehicle 1, and the like can be cited. In order to lower the steering sensitivity of the vehicle 1, for example, at least one of a limit value in the X-axis direction and the Y-axis direction of the processing unit 32e of the center of gravity target speed determination unit 32 (refer to FIG. 5) forming the first control processing unit 24 and a limit value in the Y-axis direction of the processing unit 41 (refer to FIG. 9) forming the second control processing unit 25 is adjusted so as to gradually approach 0 after an abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after occurrence of an abnormality becomes possible or easy.

For example, when the event wherein the user dismounting from the occupant riding section 5 is detected after drop of the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has restored to a normal value is confirmed after excessive supply current to the constituting component of the vehicle 1 is detected, the steering sensitivity of the vehicle 1 may be raised.

In the respective embodiments, the joy stick 12 was used as an operation tool for outputting the advancing/retreating command and the transverse moving command, however, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

Further, when the vehicle 1 is turned according to operation of an operation tool such as a joy stick, it may be configured that the target turning angular velocity in turning motion of the vehicle 1, or the moving speed in the Y-axis direction or the turning radius and the like of the first moving motion unit 3 can be designated in the control device 21 by operation of the operation tool.

Also, the inverted pendulum type vehicle may include the first moving motion unit 3 only without including the second moving motion unit 4. Further, the inverted pendulum type vehicle may be configured so as to be capable of tilting the occupant riding section 5 only in the direction around Y-axis and to be capable of moving only in the X-axis direction (front/rear direction).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An inverted pendulum vehicle comprising:
    a moving motion unit configured to be capable of moving on a floor surface;
    an actuator device for driving the moving motion unit;
    a base that incorporates the moving motion unit and the actuator device;
    an occupant riding section incorporated into the base for tilting with respect to a vertical direction;
    a tilting state detection unit for detecting the tilting state of the occupant riding section; and
    a control device configured for controlling motion of the actuator device at least according to the tilting state of the occupant riding section detected by the tilting state detection unit,
    wherein the control device is configured to include control gain adjusting means for changing, according to the detected tilting state of the occupant riding section, the magnitude of a control gain used for controlling motion of the actuator device according to the tilting state of the occupant riding section, in a period in which the state of the inverted pendulum type vehicle shifts from a stop support state to a support release reference riding state at the time the occupant steps onto the occupant riding section, or in a period shifting from the support release reference riding state to the stop support state at the time the occupant steps off from the occupant riding section, the stop support state being a state supported by a support mechanism and stopping, and the support release reference riding state being a state where an occupant rides on the occupant riding section in a reference altitude state and support of the inverted pendulum type vehicle by the support mechanism is released.

2. The inverted pendulum vehicle according to claim 1, wherein when the inclination angle of the occupant riding section in the stop support state is defined as a first inclination angle and the inclination angle of the occupant riding section in the support release reference riding state is defined as a second inclination angle, the control gain adjusting means is configured to change the magnitude of the control gain wherein the magnitude of the control gain increases accompanying that the inclination angle of the occupant riding section shown by the detected tilting state of the occupant riding section approaches from the first inclination angle to the second inclination angle, in a period shifting from the stop support state to the support release reference riding state or in a period shifting from the support release reference riding state to the stop support state.

3. The inverted pendulum vehicle according to claim 2, wherein the control gain adjusting means is configured to change the magnitude of the control gain wherein the change amount of the magnitude of the control gain per unit change amount of the inclination angle of the occupant riding section shown by the detected tilting state of the occupant riding section becomes larger than the change amount of the magnitude of the control gain in an angle range closer to the first inclination angle and in an angle range closer to the second inclination angle than an intermediate angle range between the first inclination angle and the second inclination angle in the intermediate angle range, in a period shifting from the stop support state to the support release reference riding state or in a period shifting from the support release reference riding state to the stop support state.

4. The inverted pendulum vehicle according to claim 2, wherein:
    the control gain includes a first control gain used for controlling movement of the moving motion unit in the right/left direction of the inverted pendulum type vehicle by the actuator device, and a second control gain used for controlling movement of the moving motion unit in the front/rear direction of the inverted pendulum type vehicle by the actuator device; and
    the control gain adjusting means is configured to change the magnitude of the first control gain and the second control gain so that an angle range of the inclination angle of the occupant riding section that exhibits such a characteristic that the magnitude of the first control gain increases accompanying that the inclination angle of the occupant riding section shown by the detected tilting state of the occupant riding section approaches from the first inclination angle to the second inclination angle in a period shifting from the stop support state to the support release reference riding state or in a period shifting from the support release reference riding state to the stop support state becomes an angle range closer to the first inclination angle than an angle range of the inclination angle of the occupant riding section that exhibits such a characteristic that the magnitude of the second control gain increases accompanying that the inclination angle of the occupant riding section shown by the detected tilting state of the occupant riding section approaches from the first inclination angle to the second inclination angle.

5. The inverted pendulum vehicle according to claim 3, wherein:
    the control gain includes a first control gain used for controlling movement of the moving motion unit in the right/left direction of the inverted pendulum type vehicle by the actuator device, and a second control gain used for controlling movement of the moving motion unit in the front/rear direction of the inverted pendulum type vehicle by the actuator device; and the control gain adjusting means is configured to change the magnitude of the first control gain and the second control gain so that an angle range of the inclination angle of the occupant riding section that exhibits such a characteristic that the magnitude of the first control gain increases accompanying that the inclination angle of the occupant riding section shown by the detected tilting state of the occupant riding section approaches from the first inclination angle to the second inclination angle in a period shifting from the stop support state to the support release reference riding state or in a period shifting from the support release reference riding state to the stop support state becomes an angle range closer to the first inclination angle than an angle range of the inclination angle of the occupant riding section that exhibits such a characteristic that the magnitude of the second control gain increases accompanying that the inclination angle of the occupant riding section shown by the detected tilting state of the occupant riding section approaches from the first inclination angle to the second inclination angle.

6. The inverted pendulum vehicle according to claim 1, wherein the control gain adjusting means is configured to forcibly increase the magnitude of the control gain when the inclination angle of the occupant riding section shown by the detected tilting state of the occupant riding section becomes the angle on the rearward inclined side of the occupant in a period shifting from the support release reference riding state to the stop support state at the time of the stepping off of the occupant from the occupant riding section.

7. The inverted pendulum vehicle according to claim 2, wherein the control gain adjusting means is configured to forcibly increase the magnitude of the control gain when the inclination angle of the occupant riding section shown by the detected tilting state of the occupant riding section becomes the angle on the rearward inclined side of the occupant in a period shifting from the support release reference riding state to the stop support state at the time of the stepping off of the occupant from the occupant riding section.

8. The inverted pendulum vehicle according to claim 3, wherein the control gain adjusting means is configured to forcibly increase the magnitude of the control gain when the inclination angle of the occupant riding section shown by the detected tilting state of the occupant riding section becomes the angle on the rearward inclined side of the occupant in a period shifting from the support release reference riding state to the stop support state at the time of the stepping off of the occupant from the occupant riding section.

9. The inverted pendulum vehicle according to claim 4, wherein the control gain adjusting means is configured to forcibly increase the magnitude of the control gain when the inclination angle of the occupant riding section shown by the detected tilting state of the occupant riding section becomes the angle on the rearward inclined side of the occupant in a period shifting from the support release reference riding state to the stop support state at the time of the stepping off of the occupant from the occupant riding section.

10. The inverted pendulum vehicle according to claim 1, wherein the control gain adjusting means is configured to forcibly increase the magnitude of the control gain when the moving speed of the moving motion unit increases at a temporal change rate of a predetermined value or more in a period shifting from the support release reference riding state to the stop support state at the time of the stepping off of the occupant from the occupant riding section.

11. The inverted pendulum vehicle according to claim 2, wherein the control gain adjusting means is configured to forcibly increase the magnitude of the control gain when the moving speed of the moving motion unit increases at a temporal change rate of a predetermined value or more in a period shifting from the support release reference riding state to the stop support state at the time of the stepping off of the occupant from the occupant riding section.

12. The inverted pendulum vehicle according to claim 3, wherein the control gain adjusting means is configured to forcibly increase the magnitude of the control gain when the moving speed of the moving motion unit increases at a temporal change rate of a predetermined value or more in a period shifting from the support release reference riding state to the stop support state at the time of the stepping off of the occupant from the occupant riding section.

13. The inverted pendulum vehicle according to claim 1, further comprising notifying means for notifying of the detected tilting state of the occupant riding section in a period shifting from the stop support state to the support release reference riding state or in a period shifting from the support release reference riding state to the stop support state.

14. The inverted pendulum vehicle according to claim 2, further comprising notifying means for notifying of the detected tilting state of the occupant riding section in a period shifting from the stop support state to the support release reference riding state or in a period shifting from the support release reference riding state to the stop support state.

15. The inverted pendulum vehicle according to claim 3, further comprising notifying means for notifying of the detected tilting state of the occupant riding section in a period shifting from the stop support state to the support release reference riding state or in a period shifting from the support release reference riding state to the stop support state.

16. The inverted pendulum vehicle according to claim 13, wherein the notifying means is configured to notify of the tilting state of the occupant riding section by at least either one of a LED display and a speaker.

17. An inverted pendulum vehicle comprising:
a moving motion unit configured to be capable of moving on a floor surface;
an actuator device for driving the moving motion unit;
an occupant riding section incorporated into a base for tilting with respect to a vertical direction;
a tilting state detection unit for detecting the tilting state of the occupant riding section; and
a control device configured for controlling motion of the actuator device at least according to the tilting state of the occupant riding section detected by the tilting state detection unit,
wherein the control device is configured to include control gain adjusting means for changing, according to the detected tilting state of the occupant riding section, the magnitude of a control gain used for controlling motion of the actuator device according to the tilting state of the occupant riding section, in a period in which the state of the inverted pendulum type vehicle shifts from a stop support state to a support release reference riding state at the time the occupant steps onto the occupant riding section, or in a period shifting from the support release reference riding state to the stop support state at the time the occupant steps off from the occupant riding section, the stop support state being a state supported by a support mechanism and stopping, and the support release reference riding state being a state where an occupant rides on the occupant riding section in a reference attitude state and support of the inverted pendulum type vehicle by the support mechanism is released.

18. The inverted pendulum vehicle according to claim 17, wherein when the inclination angle of the occupant riding section in the stop support state is defined as a first inclination angle and the inclination angle of the occupant riding section in the support release reference riding state is defined as a second inclination angle, the control gain adjusting means is configured to change the magnitude of the control gain wherein the magnitude of the control gain increases accompanying that the inclination angle of the occupant riding section shown by the detected tilting state of the occupant riding section approaches from the first inclination angle to the second inclination angle, in a period shifting from the stop support state to the support release reference riding state or in a period shifting from the support release reference riding state to the stop support state.

19. The inverted pendulum vehicle according to claim 18, wherein the control gain adjusting means is configured to change the magnitude of the control gain wherein the change amount of the magnitude of the control gain per unit change amount of the inclination angle of the occupant riding section shown by the detected tilting state of the occupant riding section becomes larger than the change amount of the magnitude of the control gain in an angle range closer to the first inclination angle and in an angle range closer to the second inclination angle than an intermediate angle range between the first inclination angle and the second inclination angle in the intermediate angle range, in a period shifting from the stop support state to the support release reference riding state or in a period shifting from the support release reference riding state to the stop support state.

20. The inverted pendulum vehicle according to claim 18, wherein:

the control gain includes a first control gain used for controlling movement of the moving motion unit in the right/left direction of the inverted pendulum type vehicle by the actuator device, and a second control gain used for controlling movement of the moving motion unit in the front/rear direction of the inverted pendulum type vehicle by the actuator device; and the control gain adjusting means is configured to change the magnitude of the first control gain and the second control gain so that an angle range of the inclination angle of the occupant riding section that exhibits such a characteristic that the magnitude of the first control gain increases accompanying that the inclination angle of the occupant riding section shown by the detected tilting state of the occupant riding section approaches from the first inclination angle to the second inclination angle in a period shifting from the stop support state to the support release reference riding state or in a period shifting from the support release reference riding state to the stop support state becomes an angle range closer to the first inclination angle than an angle range of the inclination angle of the occupant riding section that exhibits such a characteristic that the magnitude of the second control gain increases accompanying that the inclination angle of the occupant riding section shown by the detected tilting state of the occupant riding section approaches from the first inclination angle to the second inclination angle.

\* \* \* \* \*